US012626577B2

(12) United States Patent
Kajitani

(10) Patent No.: US 12,626,577 B2
(45) Date of Patent: May 12, 2026

(54) DATA RELAY DEVICE, MEASUREMENT SYSTEM, DATA RELAY METHOD, AND RECORDING MEDIUM

(71) Applicant: NEC Corporation, Tokyo (JP)

(72) Inventor: Hiroshi Kajitani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 335 days.

(21) Appl. No.: 18/202,741

(22) Filed: May 26, 2023

(65) Prior Publication Data

US 2023/0394947 A1 Dec. 7, 2023

(30) Foreign Application Priority Data

Jun. 6, 2022 (JP) ................................ 2022-091725

(51) Int. Cl.
*G08B 21/04* (2006.01)

(52) U.S. Cl.
CPC ................................ *G08B 21/0446* (2013.01)

(58) Field of Classification Search
CPC .................................................. G08B 21/0446
See application file for complete search history.

(56) References Cited

U.S. PATENT DOCUMENTS

2016/0085999 A1* 3/2016 Oppenheimer ..... G06F 11/3419 726/35
2023/0000396 A1* 1/2023 Coffey .................. A61B 5/1117
2025/0251263 A1* 8/2025 Walker ................. A43B 3/0031

FOREIGN PATENT DOCUMENTS

| | | |
|---|---|---|
| JP | 2006-308301 A | 11/2006 |
| JP | 2012-113527 A | 6/2012 |
| JP | 2017-187935 A | 10/2017 |
| JP | 2018-081339 A | 5/2018 |
| JP | 2018-094242 A | 6/2018 |
| WO | 2016/139844 A1 | 9/2016 |
| WO | 2020/240751 A1 | 12/2020 |
| WO | 2021/079415 A1 | 4/2021 |

OTHER PUBLICATIONS

JP Office Action for JP Application No. 2022-091725, mailed on Jan. 27, 2026 with English Translation.

* cited by examiner

*Primary Examiner* — Robert J Michaud
(74) *Attorney, Agent, or Firm* — Sughrue Mion, PLLC

(57) ABSTRACT

A data relay device including a communication unit that receives gait data including a feature amount extracted from sensor data related to a motion of a foot measured by a measurement device mounted in footwear of a subject, a storage unit that stores the received gait data, a sound input/output unit that outputs a sound to the subject in response to reception of the gait data, and an output unit that outputs target data including the gait data stored in the storage unit at a preset transmission timing.

8 Claims, 19 Drawing Sheets

DATA RELAY DEVICE, MEASUREMENT SYSTEM, DATA RELAY METHOD, AND RECORDING MEDIUM

This application is based upon and claims the benefit of priority from Japanese Patent Application No. 2022-091725, filed on Jun. 6, 2022, the disclosure of which is incorporated herein in its entirety by reference.

TECHNICAL FIELD

The present disclosure relates to a data relay device and the like used for relaying data.

BACKGROUND ART

With growing interest in healthcare, services that provide information according to a gait have attracted attention. For example, a technique for analyzing a gait using sensor data measured by a sensor mounted in footwear such as shoes has been developed. A feature associated with a gait event related to a physical condition appears in the time series data of the sensor data. The physical condition of the subject can be estimated by analyzing the gait data including the feature associated with the gait event.

Patent Literature 1 (JP 2012-113527 A) discloses a pedometer attached to a shoe. The pedometer of Patent Literature 1 includes a first signal generator, a second signal generator, and a sensor assembly. The first signal generator and the second signal generator are away from each other by a certain distance and mounted on different portions of the first shoe. The sensor assembly is mounted in the second shoe. The sensor assembly has a proximity sensor and a microcontroller unit. The proximity sensor senses the signals generated by the first signal generator and the second signal generator and generates related electrical signals. The microcontroller unit has an input coupled to the proximity sensor and receives the related electrical signals and converts the related electrical signals into pedestrian motion data.

Patent Literature 2 (JP 2006-308301 A) discloses a measurement device that measures the number of steps and the like. The device of Patent Literature 2 includes a measurement means, a measurement information storage means, and a wireless communication means. The measurement means measures the number of steps, the stride length, and the gait speed of the user. The measurement information storage means stores measurement information including measured information and measurement time. The wireless communication means performs wireless communication with the outside.

Patent Literature 3 (WO 2016/139844 A) discloses a state detection device that detects a specific state of a subject in a room using information obtained by a sensor installed in a space in a closed environment. The device of Patent Literature 3 specifies an action section in which the subject performs a specific action and a non-action section in which the subject does not perform the specific action using the second information obtained from the second sensor. The device of Patent Literature 3 determines a specific state of the subject for each of the action section and the non-action section.

The pedometer of Patent Literature 1 measures the number of steps by receiving, by a proximity sensor, a magnetic impulse signal emitted from each of the first signal generator and the second signal generator. The pedometer of Patent Literature 1 generates a step count and a step time when one shoe passes the other shoe. The pedometer of Patent Literature 1 can measure the number of steps. However, the pedometer of Patent Literature 1 cannot measure acceleration and an angular velocity used for gait analysis.

The device of Patent Literature 2 is mounted in a shoe of a user. The device of Patent Literature 2 can measure the number of steps, the stride length, and the gait speed according to the gait of the user as long as the user walks wearing the shoes. JP Patent Literature 2 does not disclose a timing of collecting sensor data. Therefore, in the method of Patent Literature 2, there is a case where data regarding the gait of the user cannot be accurately collected.

The device of Patent Literature 3 detects a specific state of a subject in a space in a closed environment. In order to analyze the gait of the subject, gait data measured according to the gait outside the closed environment is necessary. However, the device of Patent Literature 3 cannot detect a specific state of the subject walking outside the closed environment.

An object of the present disclosure is to provide a data relay device and the like capable of accurately collecting gait data acquired according to a gait of a subject in accordance with daily life of the subject.

SUMMARY

A data relay device according to an aspect of the present disclosure includes a communication unit that receives gait data including a feature amount extracted from sensor data related to a motion of a foot measured by a measurement device mounted in footwear of a subject, a storage unit that stores the received gait data, a sound input/output unit that outputs a sound to the subject in response to reception of the gait data, and an output unit that outputs target data including the gait data stored in the storage unit at a preset transmission timing.

A data relay method according to an aspect of the present disclosure includes a computer receiving gait data including a feature amount extracted from sensor data related to a motion of a foot of a subject, storing the received gait data, outputting a sound to the subject in response to reception of the gait data, and outputting target data including the stored gait data at a preset transmission timing.

A program according to an aspect of the present disclosure causes a computer to execute a step of receiving gait data including a feature amount extracted from sensor data related to a motion of a foot of a subject, a step of storing the received gait data, outputting a sound to the subject in response to reception of the gait data, and a step of outputting target data including the stored gait data at a preset transmission timing.

BRIEF DESCRIPTION OF THE DRAWINGS

Exemplary features and advantages of the present invention will become apparent from the following detailed description when taken with the accompanying drawings in which.

EXAMPLE EMBODIMENT

Figure 1:
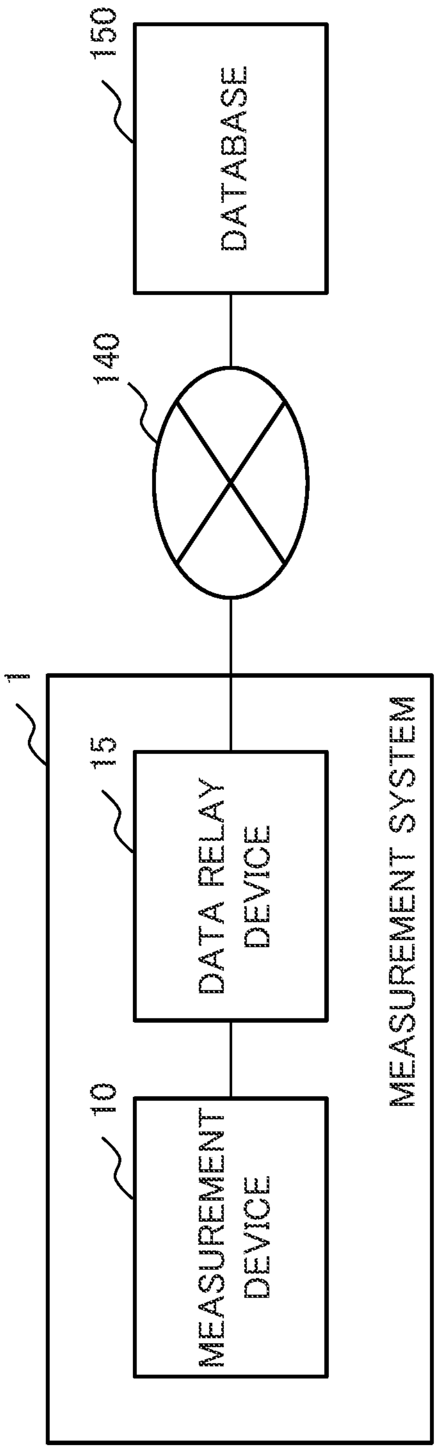
FIG. 1 is a block diagram illustrating an example of a configuration of a measurement system according to a first example embodiment.

Example embodiments of the present invention will be described below with reference to the drawings. In the following example embodiments, technically preferable limitations are imposed to carry out the present invention, but the scope of this invention is not limited to the following description. In all drawings used to describe the following example embodiments, the same reference numerals denote similar parts unless otherwise specified. In addition, in the following example embodiments, a repetitive description of similar configurations or arrangements and operations may be omitted.

First Example Embodiment

First, regarding the configuration of the measurement system according to a first example embodiment, description will be made with reference to the drawings. The measurement system measures sensor data related to the motion of the foot according to the gait of the subject using a sensor installed in footwear such as shoes. The measurement system collects sensor data in accordance with the behavior of the subject. For example, the measurement system collects sensor data transmitted in response to putting on or taking off the shoed by the subject. The measurement system extracts gait data including a feature used for estimating the physical condition of the subject from the measured sensor data. The measurement system transmits the collected gait data to a database or the like constructed in a cloud or a server.

(Configuration)

FIG. 1 is a block diagram illustrating an example of a configuration of a measurement system 1 according to the present example embodiment. The measurement system 1 includes a measurement device 10 and a data relay device 15. The measurement device 10 transmits the gait data to the data relay device 15 in a situation where the measurement device is located within the communication range with the data relay device 15. The data relay device 15 is connected to a database 150 via a network 140 such as an intranet or the Internet. The data relay device 15 transmits the gait data accumulated in the data relay device 15 to the database 150 at a preset timing. Hereinafter, an outline of the measurement system 1 will be described, and then configurations of the measurement device 10 and the data relay device 15 will be individually described.

The measurement device 10 is installed in footwear or the like of a subject (user) for whom gait data is a collected. The measurement device 10 measures sensor data according to the gait of the subject. The measurement device 10 extracts gait data including a feature used for estimating the physical condition of the subject from the measured sensor data. The measurement device 10 accumulates the extracted gait data. The measurement device 10 transmits the gait data accumulated in the measurement device in response to detecting whether the shoes are put on or taken off by the subject. For example, the measurement device 10 detects whether the shoes are put on or taken off according to a change in acceleration, a speed, or a position in a specific direction.

In a case where the gait data is not accumulated at the time point when whether the subject puts on or takes off the shoes is detected, the measurement device 10 transmits a signal (also referred to as a put-on/take-off signal) indicating whether the subject puts on or takes off the shoes. For example, when different signals are transmitted between a case where the motion of putting on shoes is detected and a case where the motion of taking off shoes is detected, it is possible to distinguish the subject going-out/coming home by the data relay device 15.

The data relay device 15 is disposed at a predetermined position such as an entrance of a residence where the subject lives. The data relay device 15 receives the gait data transmitted from the measurement device 10. The data relay device 15 accumulates the received gait data. For example, the data relay device 15 collects gait data measured for a subject who does not possess a portable device. For example, the subject is an elderly person who needs care/support. Such an elderly person often do not possess a portable device such as a smartphone. For example, the subject may be a child in an early age group or a young person who does not possess a portable device. The subject may be a person who does not have a habit of carrying a portable device or a person who tends to forget carrying a portable device. The subject may be a person carrying a portable device. There is no limitation on the subject as long as the subject is a person whose physical condition is to be estimated using the gait data.

The data relay device 15 may be disposed at a place other than the residence where the subject lives. In a case where an elderly person who needs care/support is the subject, the data relay device 15 may be disposed in a facility such as a day service, a hospital, or a clinic that the subject goes to. It is assumed that the subject is in a facility such as a home for the aged or a nursing home. In such a situation, the data relay device may be disposed at an entrance of a room where the subject stays or near a bed assigned to the subject. The position where the data relay device 15 is disposed is not limited as long as it is near the position where the shoes of the subject are disposed. For example, in a case where the health condition of an employee is managed by a company, the data relay device 15 may be disposed in the office of the subject or in the vicinity of the entrance of the office building.

Upon receiving the gait data, the data relay device 15 outputs a sound to the subject. When receiving the gait data transmitted from the measurement device 10 at the timing when the subject puts on the shoes, the data relay device 15 outputs a sound directed to the subject who goes out. When receiving the gait data transmitted from the measurement device 10 at the timing when the subject takes off the shoes, the data relay device 15 outputs a sound directed to the subject who has come home.

The data relay device 15 receives a sound emitted from the subject with respect to a sound output to the subject. The data relay device 15 converts a received sound into sound data. The data relay device 15 stores the converted sound data. The sound data is preferably stored in association with the time when the sound is received. When the sound data and the time are stored in association with each other, the time when the subject goes out/comes home can be determined. When the time of going-out and the time of coming-home can be discriminated, the time during which the subject goes out can be calculated.

The data relay device 15 transmits the target data to the database 150 constructed in the cloud or the server via the network 140. The target data is a generic term for gait data and sound data. In a case where the sound data of the subject is stored, the data relay device 15 transmits the sound data to the database 150 in addition to the gait data. The target data accumulated in the database 150 is used for estimating the physical condition of the subject and the like. The use of the target data accumulated in the database 150 is not limited. For example, the data relay device 15 may transmit target data to a terminal device (not illustrated) handled by a care support specialist or the like in charge of a subject who needs care/support.

[Measurement Device]

Figure 2:
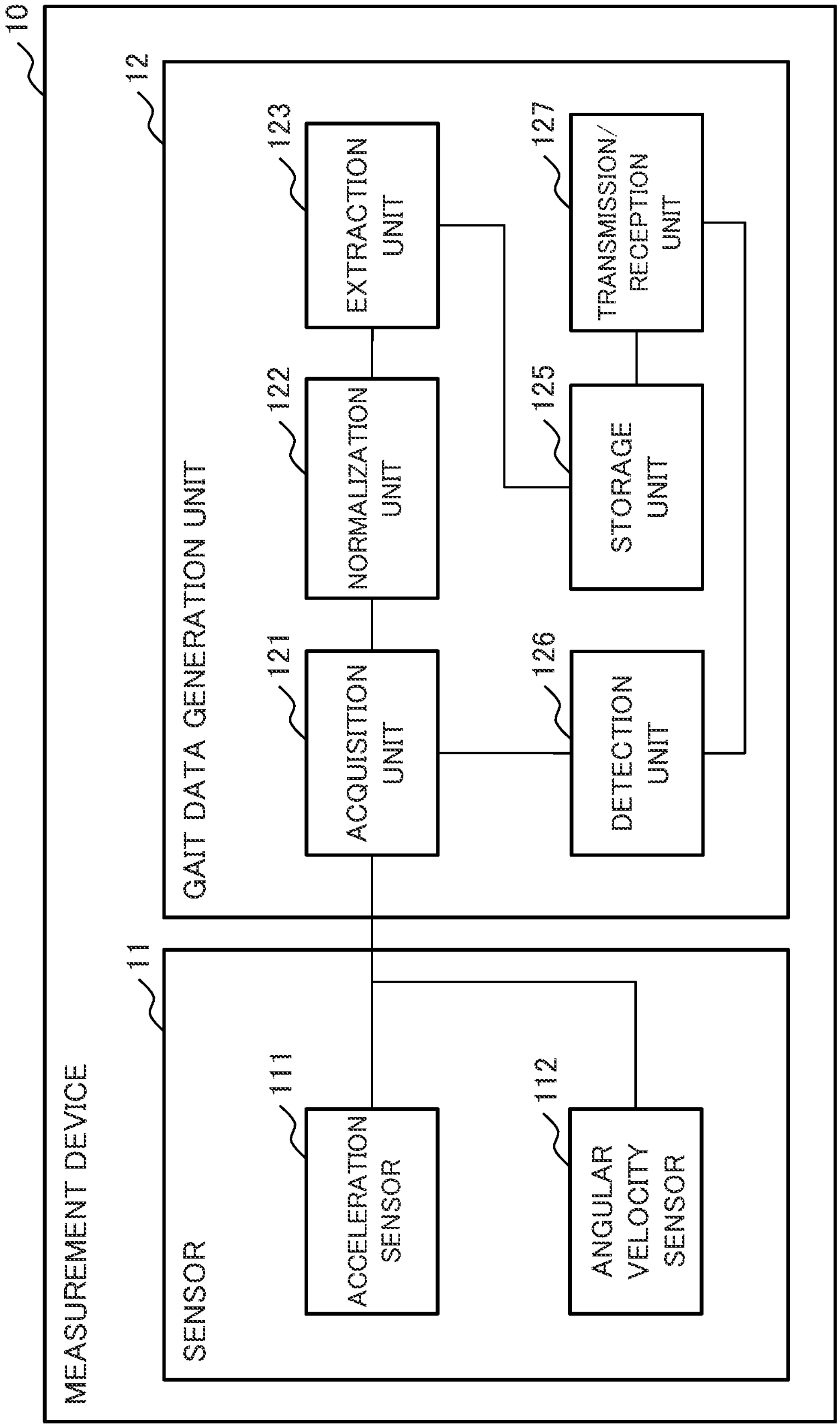
FIG. 2 is a block diagram illustrating an example of a configuration of a measurement device included in the measurement system according to the first example embodiment.

FIG. 2 is a block diagram illustrating an example of a configuration of the measurement device 10. The measurement device 10 includes a sensor 11 and a gait data generation unit 12. In the present example embodiment, an example in which the sensor 11 and the gait data generation unit 12 are integrated will be described. The sensor 11 and the gait data generation unit 12 may be provided as separate devices.

<Sensor>

As illustrated in FIG. 2, the sensor 11 includes an acceleration sensor 111 and an angular velocity sensor 112. FIG. 2 illustrates an example in which the acceleration sensor 111 and the angular velocity sensor 112 are included in the sensor 11. The sensor 11 may include a sensor other than the acceleration sensor 111 and the angular velocity sensor 112. The sensor, other than the acceleration sensor 111 and the angular velocity sensor 112, that can be included in the sensor 11 will not be described.

The acceleration sensor 111 is a sensor that measures acceleration (also referred to as spatial acceleration) in three axial directions. The acceleration sensor 111 measures acceleration (also referred to as spatial acceleration) as a physical quantity related to the motion of the foot. The acceleration sensor 111 outputs the measured acceleration to the gait data generation unit 12. For example, a sensor of a piezoelectric type, a piezoresistive type, a capacitance type, or the like can be used as the acceleration sensor 111. As long as the sensor used as the acceleration sensor 111 can measure acceleration, the measurement method is not limited.

The angular velocity sensor 112 is a sensor that measures angular velocities in three axial directions (also referred to as spatial angular velocities). The angular velocity sensor 112 measures an angular velocity (also referred to as a spatial angular velocity) as a physical quantity related to the motion of the foot. The angular velocity sensor 112 outputs the measured angular velocity to the gait data generation unit 12. For example, a sensor of a vibration type, a capacitance type, or the like can be used as the angular velocity sensor 112. As long as the sensor used as the angular velocity sensor 112 can measure the angular velocity, the measurement method is not limited.

The sensor 11 is achieved by, for example, an inertial measurement device that measures acceleration and angular velocity. An example of the inertial measurement device is an inertial measurement unit (IMU). The IMU includes the acceleration sensor 111 that measures acceleration in three axis directions and the angular velocity sensor 112 that measures angular velocities around the three axes. The sensor 11 may be achieved by an inertial measurement device such as a vertical gyro (VG) or an attitude heading reference system (AHRS). The sensor 11 may be achieved by a global positioning system/inertial navigation system (GPS/INS). The sensor 11 may be achieved by a device other than the inertial measurement device as long as it can measure a physical quantity related to the motion of the foot.

Figure 3:
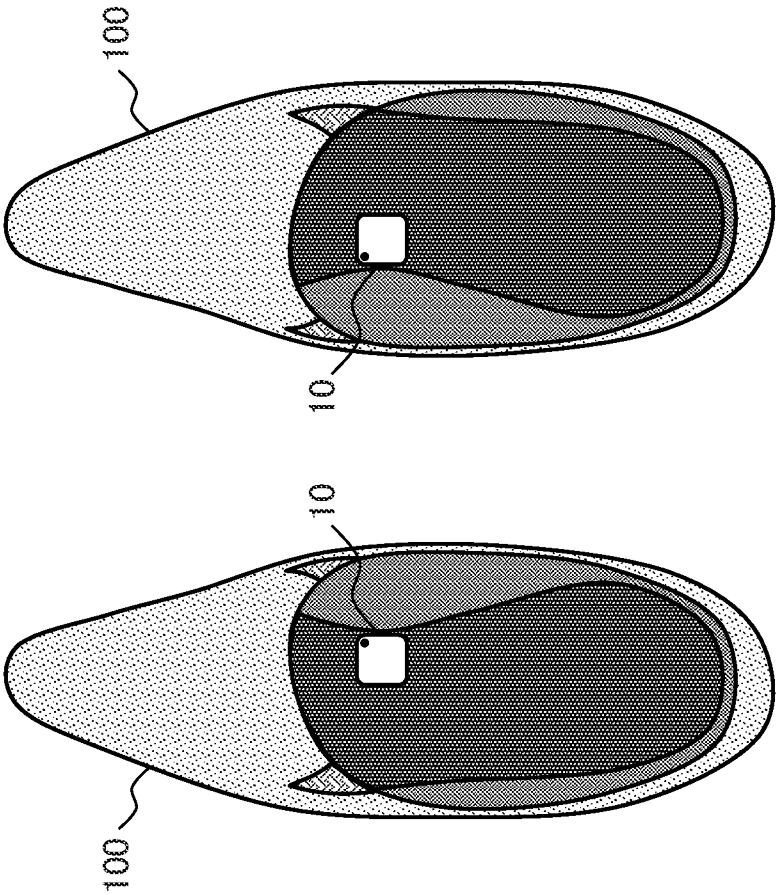
FIG. 3 is a conceptual diagram illustrating an arrangement example of the measurement device included in the measurement system according to the first example embodiment.

FIG. 3 is a conceptual diagram illustrating an arrangement example of the measurement device 10. In the example of FIG. 3, the measurement device 10 is disposed in the shoe 100 of each of both feet. In the example of FIG. 3, the measurement device 10 is installed at a position related to the back side of the arch of foot. For example, the measurement device 10 is disposed in an insole inserted into the shoe 100. For example, the measurement device 10 may be disposed on the bottom face of the shoe 100. For example, the measurement device 10 may be embedded in the main body of the shoe 100. The measurement device 10 may be detachable from the shoe 100 or may not be detachable from the shoe 100. The measurement device 10 may be installed at a position other than the back side of the arch of the foot as long as the sensor data related to the motion of the foot can be measured. The measurement device 10 may be installed on a sock worn by the subject or a decorative article such as an anklet worn by the subject. The measurement device 10 may be directly attached to the foot or may be embedded in the foot. FIG. 3 illustrates an example in which the measurement device 10 is installed in the shoe 100 of the right foot. The measurement device 10 may be installed in the shoe 100 of one foot.

Figure 4:
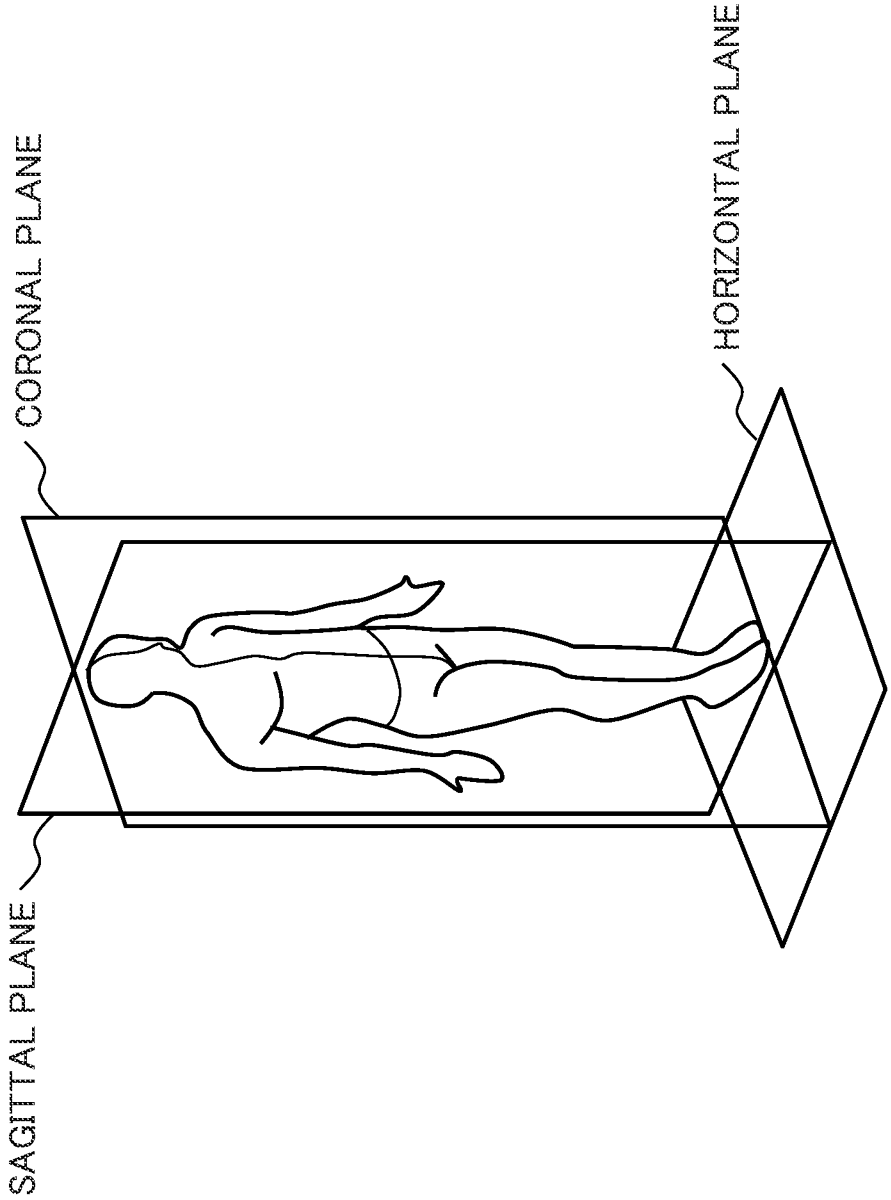
FIG. 4 is a conceptual diagram for describing a human body surface used in the description regarding the measurement device included in the measurement system according to the first example embodiment.

FIG. 4 is a conceptual diagram for explaining a face (also referred to as a human body surface) set for the human body. In the present example embodiment, a sagittal plane dividing the body into left and right, a coronal plane dividing the body into front and rear, and a horizontal plane dividing the body horizontally are defined.

<Gait Data Generation Unit>

As illustrated in FIG. 2, the gait data generation unit 12 (also referred to as a gait data generation device) includes an acquisition unit 121, a normalization unit 122, an extraction unit 123, a storage unit 125, a detection unit 126, and a transmission/reception unit 127. The gait data generation unit 12 performs overall control and data processing of the measurement device 10. For example, the gait data generation unit 12 is achieved by a microcomputer or a microcontroller. For example, the gait data generation unit 12 includes a central processing unit (CPU), a random access memory (RAM), a read only memory (ROM), a flash memory, and the like. The gait data generation unit 12 controls the acceleration sensor 111 and the angular velocity sensor 112 to measure the angular velocity and the acceleration. The gait data generation unit 12 may be attached to a mobile terminal (not illustrated) carried by the subject (user).

The acquisition unit 121 acquires acceleration in three axial directions from the acceleration sensor 111. The acquisition unit 121 acquires angular velocities around three axes from the angular velocity sensor 112. For example, the acquisition unit 121 performs analog-to-digital conversion (AD conversion) on the acquired physical quantities (analog data) such as angular velocity and acceleration. The physical quantity (analog data) measured by each of the acceleration sensor 111 and the angular velocity sensor 112 may be converted into digital data in each of the acceleration sensor 111 and the angular velocity sensor 112.

The acquisition unit 121 outputs the converted digital data (also referred to as sensor data) to the normalization unit 122. The acquisition unit 121 may be configured to store sensor data in a storage unit (not illustrated). The sensor data includes at least acceleration data converted into digital data and angular velocity data converted into digital data. The acceleration data includes acceleration vectors in three axial directions. The angular velocity data includes angular velocity vectors around three axes. The acceleration data and the angular velocity data are associated with acquisition time of the data. The acquisition unit 121 may add corrections such as a mounting error, temperature correction, and linearity correction to the acceleration data and the angular velocity data. The acquisition unit 121 may convert the coordinate system of the sensor data from the local coordinate system of the measurement device 10 to the world coordinate system. The conversion of the coordinate system may be performed by the normalization unit 122.

The acquisition unit 121 outputs sensor data for detecting whether the shoes are put on or taken off to the detection unit 126. Whether the shoes are put on or taken off is detected based on an action of the subject putting on the shoe or an action of the subject taking off the shoe. For example, whether the shoes are put on or taken off can be detected according to the value, change, or waveform of the spatial acceleration/spatial angular velocity. For example, the acquisition unit 121 outputs all the acquired sensor data to the detection unit 126. For example, the acquisition unit 121 outputs, to the detection unit 126, spatial acceleration/a spatial angular velocity exceeding a preset threshold value in the acquired sensor data. For example, the acquisition unit 121 outputs, to the detection unit 126, the spatial acceleration/spatial angular velocity exceeding a preset change amount in the acquired sensor data.

The normalization unit 122 acquires sensor data from the acquisition unit 121. The normalization unit 122 extracts time series data (also referred to as gait waveform data) for one gait cycle from the time series data of the acceleration in the three-axis direction and the angular velocities around the three axes included in the sensor data. The normalization unit 122 normalizes (also referred to as first normalization) the time of the extracted gait waveform data for one gait cycle to a gait cycle of 0 to 100% (percent). Timing such as 1% or 10% included in the 0 to 100% gait cycle is also referred to as a gait phase. The normalization unit 122 normalizes (also referred to as second normalization) the first normalized gait waveform data for one gait cycle in such a way that the stance phase is 60% and the swing phase is 40%. The stance phase is a period in which at least part of the back side of the foot is in contact with the ground. The swing phase is a period in which the back side of the foot is away from the ground. By performing the second normalization on the gait waveform data, it is possible to reduce the shift of the gait phase from which the feature amount is extracted.

Figure 5:
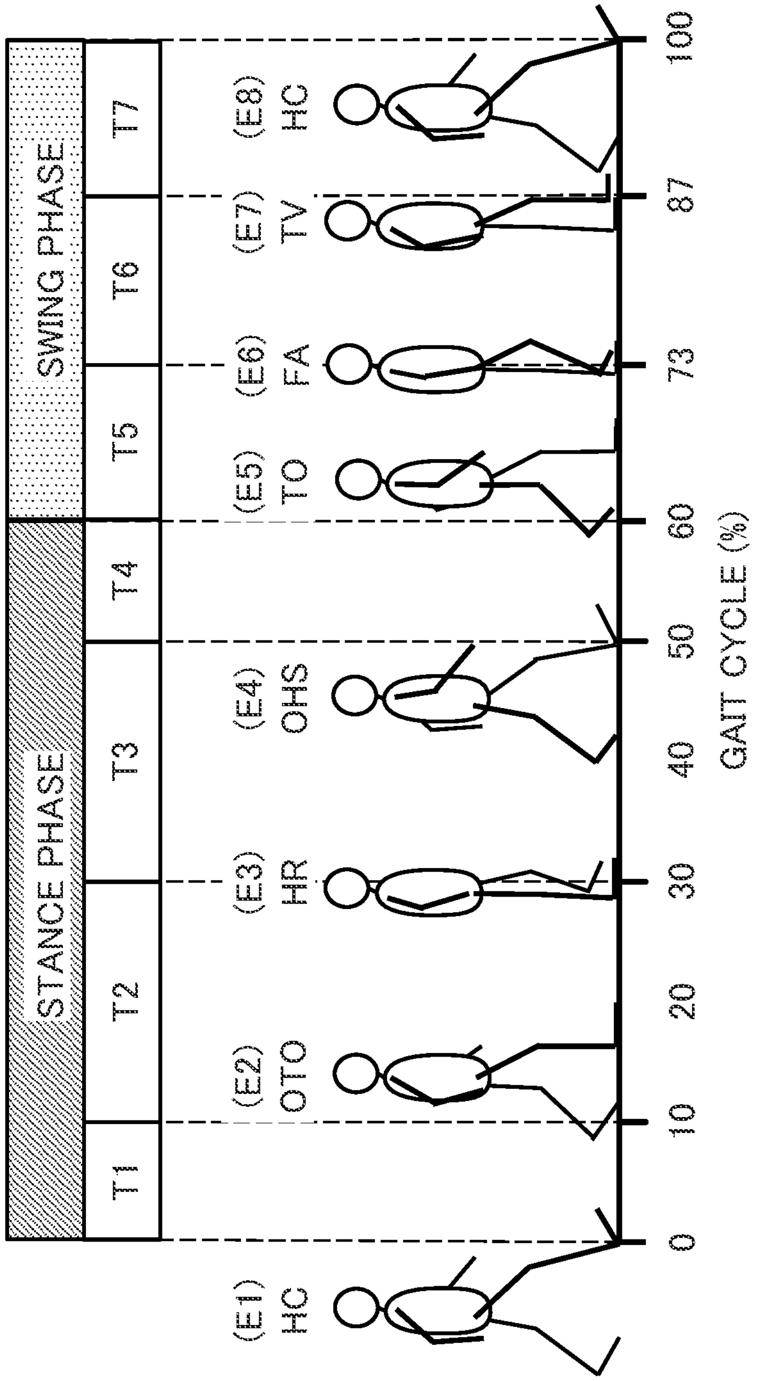
FIG. 5 is a conceptual diagram for describing a gait cycle used in the description regarding the measurement device included in the measurement system according to the first example embodiment.

FIG. 5 is a conceptual diagram for explaining a gait event detected in one gait cycle with the right foot as a reference. The horizontal axis of FIG. 5 is a gait cycle normalized with one gait cycle of the right foot as 100% (%). A time point at which the heel of the right foot lands on the ground is defined as a starting point (0%), and a time point at which the heel of the right foot lands next on the ground is defined as an end point (100%). Each of the plurality of timings included in one gait cycle is a gait phase. One gait cycle of one foot is roughly divided into a stance phase and a swing phase. In the example of FIG. 5, the gait cycle is normalized in such a way that the stance phase occupies 60% and the swing phase occupies 40%. The stance phase is subdivided into an initial stance period T1, a mid-stance period T2 of standing, a terminal stance period T3 of standing, and a pre-swing period T4. The swing phase is subdivided into an initial swing period T5, a mid-swing period T6, and a terminal swing period T7. In the gait waveform in one gait cycle, the time point when the heel lands on the ground may not be set as a starting point. For example, the starting point of the gait waveform in one gait cycle may be set at a center time point of the stance phase or the like.

A gait event E1 represents a heel contact (HC) at the beginning of one gait cycle. The heel contact is an event in which the heel of the right foot, which has been away from the ground in the swing phase, lands on the ground. A gait event E2 represents an opposite toe off (ONO). The opposite toe off is an event in which the toe of the left foot is away from the ground in a state where the ground contact surface of the sole of the right foot is in contact with the ground. A gait event E3 represents a heel rise (HR). The heel rise is an event in which the heel of the right foot is raised in a state where the ground contact surface of the sole of the right foot is in contact with the ground. A gait event E4 represents an opposite heel strike (OHS). The opposite heel contact is an event in which the heel of the left foot, which has been away from the ground in the swing phase of the left foot, lands on the ground. A gait event E5 represents a toe off (TO). The toe off is an event in which the toe of the right foot is away from the ground in a state where the ground contact surface of the sole of the left foot is in contact with the ground. A gait event E6 represents a foot adjacent (FA). The foot adjacent is an event in which the left foot and the right foot cross each other in a state where the ground contact surface of the sole of the left foot is in contact with the ground. A gait event E7 represents a tibia vertical (TV). The tibia vertical is an event in which the tibia of the right foot is substantially perpendicular to the ground while the sole of the left foot is in contact with the ground. A gait event E8 represents a heel strike (HS) at the end of one gait cycle. The gait event E8 corresponds to the end point of the gait cycle starting from the gait event E1 and corresponds to the starting point of the next gait cycle.

Figure 8:
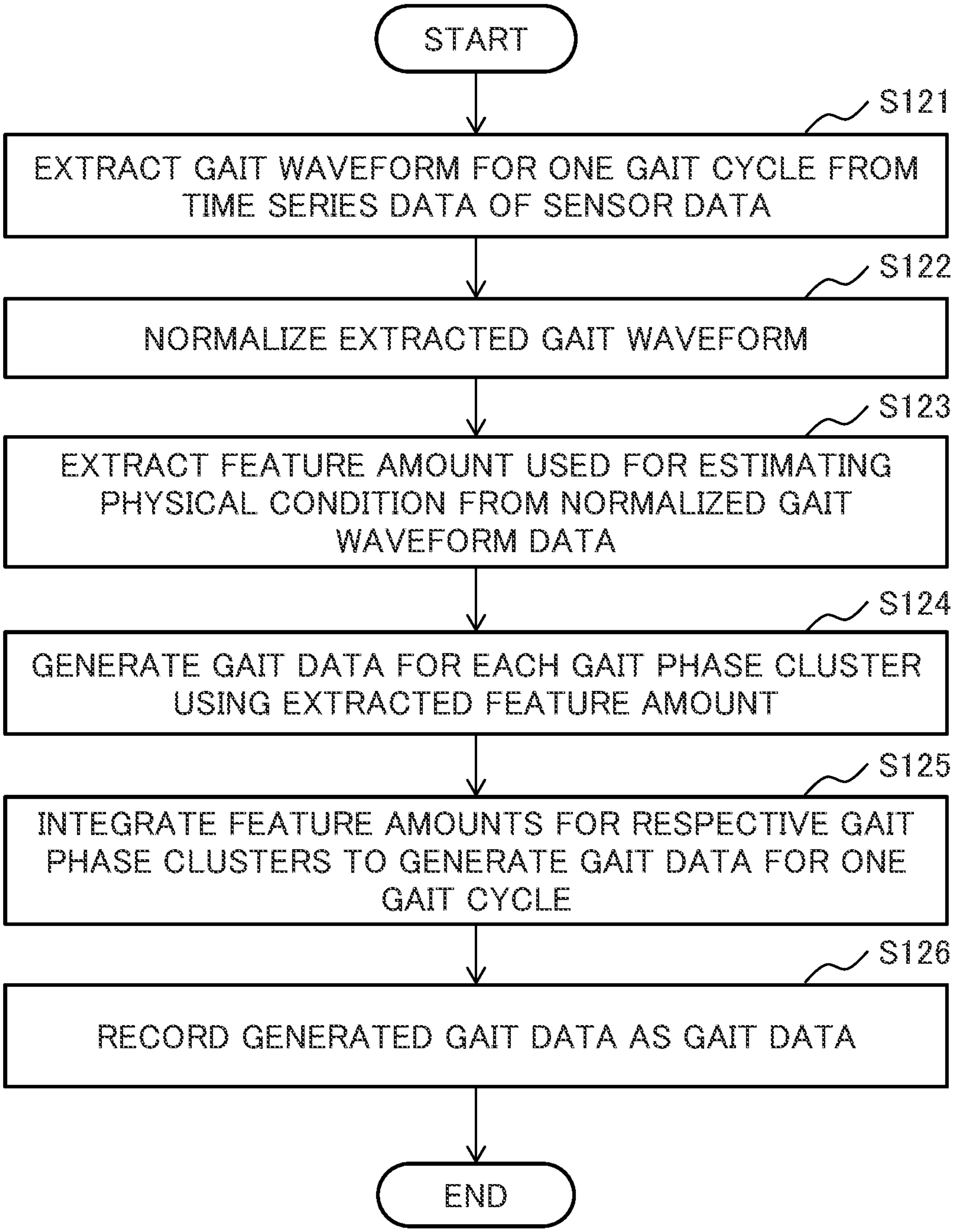
FIG. 8 is a flowchart for explaining an example of a gait data measurement process by the measurement system according to the first example embodiment.

The normalization unit 122 normalizes a section from the heel contact HC in which the gait phase is 0% to the toe off TO subsequent to the heel contact HC to 0 to 60%. The normalization unit 122 normalizes a section from the toe off TO to the heel contact HC in which the gait phase subsequent to the toe off TO is 100% to 60 to 100%. As a result, the gait waveform data for one gait cycle is normalized to a section (stance phase) in which the gait cycle is 0 to 60% and a section (swing phase) in which the gait cycle is 60 to 100%. In FIG. 8, the gait waveform data after the second normalization is indicated by a solid line. In the gait waveform data after the second normalization, the timing of the toe off TO coincides with 60%.

The normalization unit 122 extracts/normalizes gait waveform data for one gait cycle in accordance with the gait cycle of the acceleration in the traveling direction with respect to acceleration/angular velocity other than the acceleration in the traveling direction. The normalization unit 122 may generate time series data of angles around three axes by integrating time series data of angular velocities around the three axes. In this case, the normalization unit 122 extracts/normalizes the gait waveform data for one gait cycle in accordance with the gait cycle of the acceleration in the traveling direction with respect to the angles around the three axes.

The normalization unit 122 may extract/normalize gait waveform data for one gait cycle based on acceleration/angular velocity other than the acceleration in the traveling direction. For example, the normalization unit 122 may detect the heel contact HC and the toe off TO from the time series data of the vertical acceleration. The timing of the heel contact HC is a timing of a steep minimum peak appearing in the time series data of the vertical acceleration. At the timing of the steep minimum peak, the value of the vertical acceleration is substantially zero. The minimum peak serving as a mark of the timing of the heel contact HC corresponds to the minimum peak of the gait waveform data for one gait cycle. A section between the consecutive heel contacts HC is one gait cycle. The timing of the toe off TO is a timing of an inflection point in the middle of gradually increasing after the time series data of the vertical acceleration passes through a section with a small fluctuation after the maximum peak immediately after the heel contact HC.

The normalization unit 122 may extract/normalize the gait waveform data for one gait cycle based on both the acceleration in the traveling direction and the vertical acceleration. The normalization unit 122 may extract/normalize the gait waveform data for one gait cycle based on acceleration, angular velocity, angle, and the like other than the acceleration in the traveling direction and the vertical acceleration.

The extraction unit 123 acquires gait waveform data for one gait cycle normalized by the normalization unit 122. The extraction unit 123 extracts a feature amount used for estimating an index value indicating the knee state from the gait waveform data for one gait cycle. The extraction unit 123 stores the extracted feature amount in the storage unit 125. For example, the extraction unit 123 extracts a feature amount for each gait phase cluster from a gait phase cluster obtained by integrating temporally continuous gait phases based on a preset condition. The gait phase cluster includes at least one gait phase. The gait phase cluster also includes a single gait phase.

The extraction unit 123 may generate a feature amount (second feature amount) of the gait phase cluster. The gait phase cluster is a cluster in which temporally continuous gait phases are integrated. The gait phase cluster includes at least one gait phase. The gait phase cluster may be composed of a single gait phase. The extraction unit 123 stores the feature amount for each gait phase cluster in the storage unit 125.

For example, the extraction unit 123 applies the feature amount constitutive expression to the feature amount (first feature amount) extracted from each of the gait phases constituting the gait phase cluster to generate the second feature amount. The feature amount constitutive expression is a preset calculation expression for generating the feature amount of the gait phase cluster. For example, the feature amount constitutive expression is a calculation expression related to four arithmetic operations. For example, the second feature amount calculated using the feature amount constitutive expression is an integral average value, an arithmetic average value, an inclination, a variation, or the like of the first feature amount in each gait phase included in the gait phase cluster. For example, the extraction unit 123 applies a calculation expression for calculating the inclination and the variation of the first feature amount extracted from each of the gait phases constituting the gait phase cluster as the feature amount constitutive expression. For example, in a case where the gait phase cluster is configured by a single gait phase, it is not possible to calculate the inclination and the variation, and thus, it is sufficient to use a feature amount constitutive expression for calculating an integral average value, an arithmetic average value, or the like.

The normalization unit 122 and the extraction unit 123 may be omitted according to the type of the gait data transmitted from the measurement device 10. For example, in a case where non-normalized sensor data is transmitted as gait data, the normalization unit 122 and the extraction unit 123 may be omitted. For example, in a case where normalized sensor data is transmitted as gait data, the extraction unit 123 can be omitted.

The storage unit 125 stores gait data. For example, the storage unit 125 stores the feature amount extracted by the extraction unit 123 as gait data. For example, the storage unit 125 may store, as the gait data, the feature amount of the gait phase cluster generated by the extraction unit 123. The storage unit 125 may store raw data of sensor data or normalized sensor data as gait data. The gait data stored in the storage unit 125 is output by the transmission/reception unit 127 in response to the detection unit 126 detecting whether the shoes are put on or taken off. In a case where the gait data is output at the timing when the shoes are taken off, the gait data is not stored in the storage unit 125 at the timing when the shoes are put on next. Therefore, the gait data stored in the storage unit 125 is mainly output at the timing when the shoes are taken off. At the timing when the shoes are taken off, gait data measured according to the gait of the subject is accumulated in the storage unit 125. Therefore, the timing when the shoes are taken off is a timing at which the accumulated gait data can be accurately output.

The detection unit 126 acquires, from the acquisition unit 121, sensor data for detecting whether the shoes are put on or taken off. The detection unit 126 detects whether the shoes are put on or taken off based on an action of the subject putting on the shoe or an action of the subject taking off the shoe. For example, the detection unit 126 detects whether the shoes are put on or taken off according to the value, change, or waveform of the spatial acceleration/spatial angular velocity. When detecting the shoes are put on, the detection unit 126 outputs a signal indicating the shoes are put on to the transmission/reception unit 127. It is estimated that the subject wearing the shoes goes out. When detecting the shoes are taken off, the detection unit 126 outputs a signal indicating the shoes are taken off to the transmission/reception unit 127. It is estimated that the subject who has taken off the shoes has come home. In this manner, it is possible to determine whether the subject goes out/comes home by detecting whether the shoes are put on or taken off.

As an example, the detection unit 126 acquires all of the sensor data acquired by the acquisition unit 121. For example, the detection unit 126 detects the shoes are put on in response to a rapid change in the spatial acceleration/spatial angular velocity from a substantially 0 state. For example, the detection unit 126 detects the shoes are taken off in response to a rapid change in the spatial acceleration/spatial angular velocity to a substantially 0 state. When a threshold value is provided for the amount of change in the spatial acceleration/spatial angular velocity, the detection unit 126 can detect whether the shoes are put on or taken off in response to the amount of change in the spatial acceleration/spatial angular velocity exceeding the threshold value.

For example, the detection unit 126 acquires the spatial acceleration/spatial angular velocity exceeding a preset threshold value in the sensor data acquired by the acquisition unit 121. For example, the detection unit 126 acquires the spatial acceleration/spatial angular velocity exceeding a preset change amount in the sensor data acquired by the acquisition unit 121. The detection unit 126 can detect whether the shoes are put on or taken off according to the acquisition of the spatial acceleration/spatial angular velocity exceeding a preset threshold value or the spatial acceleration/spatial angular velocity exceeding a preset change amount.

The detection unit 126 may detect whether the shoes are put on or taken off according to a specific action performed when the subject puts on or takes off the shoes. The specific action to be detected by detection unit 126 is not particularly limited. An example of the specific action to be detected will be listed below. For example, the subject often has a habit on how to put on or take off the shoe. Therefore, it may be configured in such a way that a model that is trained in the feature of the subject in taking on and off the shoe is generated, and whether the shoes are put on or taken off is detected using the model. With such a configuration, the subject can be identified according to the feature detected when the shoes are put on or taken off.

For example, it is assumed that the subject puts the foot in the shoes placed at the entrance and lifts the heel in order to put on the shoes. In such a case, the detection unit 126 detects that the angle of the measurement device 10 based on the sensor data has rapidly changed, so that it is possible to detect that the shoes are put on. For example, it is assumed that the subject lifts the shoes to a certain height or more in order to put on the shoes placed at the entrance. In such a case, the detection unit 126 can detect that the shoes are put on by detecting that the height of the measurement device 10 based on the sensor data is raised to a certain height or more.

For example, it is assumed that the subject puts the foot into the shoe placed at the entrance, and then hits the toe against the ground in order to put on the shoes. In such a case, the detection unit 126 detects that the space position of the measurement device 10 based on the sensor data has periodically changed, so that it is possible to detect that the shoes are put on.

For example, it is assumed that when the subject comes home, the subject temporarily stops walking in front of the door and then moves into the entrance to take off the shoes. In such a case, the detection unit 126 detects that the spatial acceleration of the measurement device 10 based on the sensor data is 0 for a certain period of time, and immediately thereafter, the spatial acceleration/spatial angular velocity indicates a complicated change and then is 0, whereby it is possible to detect the shoes are taken off. For example, it is assumed that the subject takes off the shoes at the entrance and arranges the taken-off shoes when coming home. In such a case, the detection unit 126 detects that the spatial acceleration/spatial angular velocity is 0 after the orientations of the measurement devices 10 based on the sensor data installed in the left and right shoes are aligned, whereby it is possible to detect the shoes are taken off. For example, it is assumed that when the subject comes home, the shoes taken off at the entrance are left in a positional relationship that cannot be in a worn state. In such a case, the detection unit 126 detects that the orientations and positions of the measurement devices 10 based on the sensor data installed in the right and left shoes are different and the spatial acceleration/spatial angular velocity is 0, whereby it is possible to detect the shoes are taken off.

The transmission/reception unit 127 transmits the gait data accumulated in the storage unit 125 in response to the detection unit 126 detecting whether the shoes are put on or taken off. For example, the transmission/reception unit 127 transmits the gait data to the data relay device 15 via wireless communication. For example, the transmission/reception unit 127 is configured to transmit the gait data to the data relay device 15 via a wireless communication function (not illustrated) conforming to a standard such as Bluetooth (registered trademark) or WiFi (registered trademark). The communication function of the transmission/reception unit 127 may conform to a standard other than Bluetooth (registered trademark) or WiFi (registered trademark).

[Data Relay Device]

Figure 6:
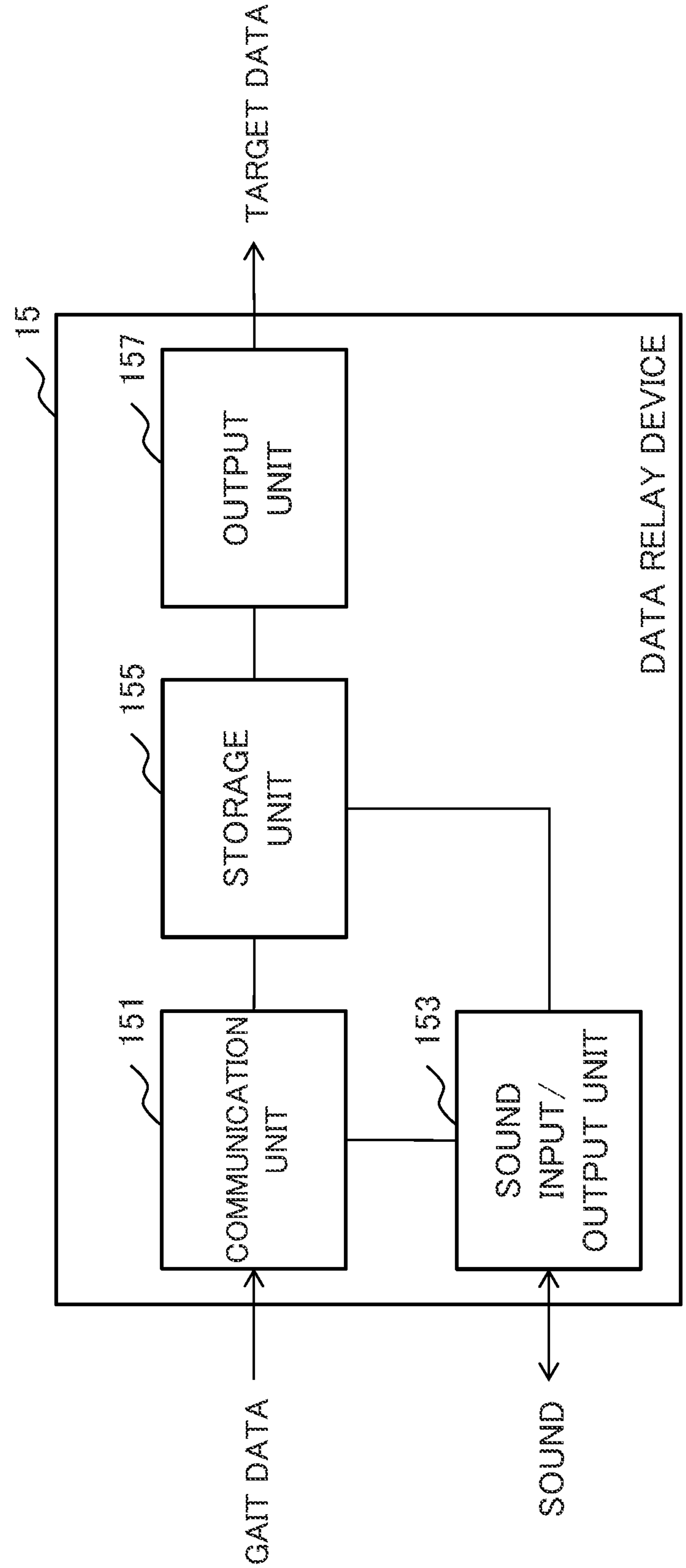
FIG. 6 is a block diagram illustrating an example of a configuration of a data relay device included in the measurement system according to the first example embodiment.

FIG. 6 is a block diagram illustrating an example of a configuration of the data relay device 15. The data relay device 15 includes a communication unit 151, a sound input/output unit 153, a storage unit 155, and an output unit 157.

The communication unit 151 receives the gait data transmitted from the measurement device 10. The communication unit 151 stores the received gait data in the storage unit 155. The communication unit 151 communicates with the transmission/reception unit 127 of the measurement device 10 by a common communication method. For example, the communication unit 151 receives the gait data from the data relay device 15 via wireless communication. For example, the communication unit 151 is configured to receive the gait data from the data relay device via a wireless communication function (not illustrated) conforming to a standard such as Bluetooth (registered trademark) or WiFi (registered trademark). The communication function of the communication unit 151 may conform to a standard other than Bluetooth (registered trademark) or WiFi (registered trademark).

The sound input/output unit 153 includes a speaker that outputs a sound and a microphone that receives a sound. The sound input/output unit 153 outputs a sound to the subject in response to reception of the gait data. The sound data to be converted into a sound to the subject may be stored in the storage unit 155. When the gait data transmitted from the measurement device 10 is received at the timing when the subject puts on the shoes, the sound input/output unit 153 outputs a sound directed to the subject who goes out. When the gait data transmitted from the measurement device 10 is received at the timing when the subject takes off the shoes, the sound input/output unit 153 outputs a sound directed to the subject who has come home. In a case where only sound output is performed, the microphone may be omitted.

The sound input/output unit 153 receives a sound uttered by the subject with respect to a sound output to the subject. The sound input/output unit 153 converts a received sound into sound data. The sound data is digital data. The sound input/output unit 153 stores the converted sound data in the storage unit 155. The sound data is preferably stored in association with the time when the sound is received. Therefore, the data relay device 15 preferably includes a clock such as a real-time clock. When the sound data is stored in association with the time, the time when the subject goes out/comes home can be determined.

The storage unit 155 stores gait data and sound data. The gait data and the sound data stored in the storage unit 155 are collectively referred to as target data. The storage unit 155 accumulates the target data at the transmission interval of the target data by the output unit 157. The target data accumulated in the storage unit 155 is output at a transmission timing of the target data. The target data accumulated in the storage unit 155 is deleted in accordance with the transmission of the target data. For example, a situation in which the transmitted target data does not reach the database 150 is also assumed. Therefore, the target data accumulated in the storage unit 155 may be deleted after the signal making a notification of the reception of the target data is acquired from the database 150.

The output unit 157 is a communication interface that transmits the target data. The output unit 157 transmits the target data to the database 150 constructed in the cloud or the server via the network 140. The target data accumulated in the database 150 is used for estimating the physical condition of the subject and the like. Examples of the physical condition to be estimated include hallux valgus, pronation/supination degree, and left-right balance in gait. Examples of the physical condition to be estimated include muscle strength indices such as grip strength and knee extension strength, dynamic balance, lower limb muscle strength, movement ability, static balance, and falling easiness. The physical condition to be estimated is not particularly limited as long as the physical condition can be estimated using the gait data included in the target data. For example, the output unit 157 may transmit the target data to a terminal device (not illustrated) handled by a care support specialist, a doctor, a physical therapist, or the like who is in charge of the subject who needs care/support. The use of the gait data accumulated in the database 150 is not limited.

The output unit 157 may be a general-purpose interface conforming to a standardized standard instead of the communication interface. For example, Universal Serial Bus (USB) or Institute of Electrical and Electronics Engineers (IEEE) can be cited as an international standard. The standard applied to the output unit 157 is not particularly limited.

The output unit 157 may be an interface capable of reading and writing data on a recording medium, instead of a communication interface. Examples of the recording medium include an optical recording medium, a semiconductor recording medium, and a magnetic recording medium. Examples of the optical recording medium include a compact disc (CD) and a digital versatile disc (DVD). Examples of the semiconductor recording medium include a Universal Serial Bus (USB) memory and a secure digital (SD) card. An example of the magnetic recording medium includes a flexible disk. The type of the recording medium which data is read from and written to via the output unit 157 is not particularly limited.

(Operation)

Next, an operation of the measurement system 1 will be described with reference to the drawings. The measurement device 10 and the data relay device 15 included in the measurement system 1 will be individually described.

[Measurement Device]

Figure 7:
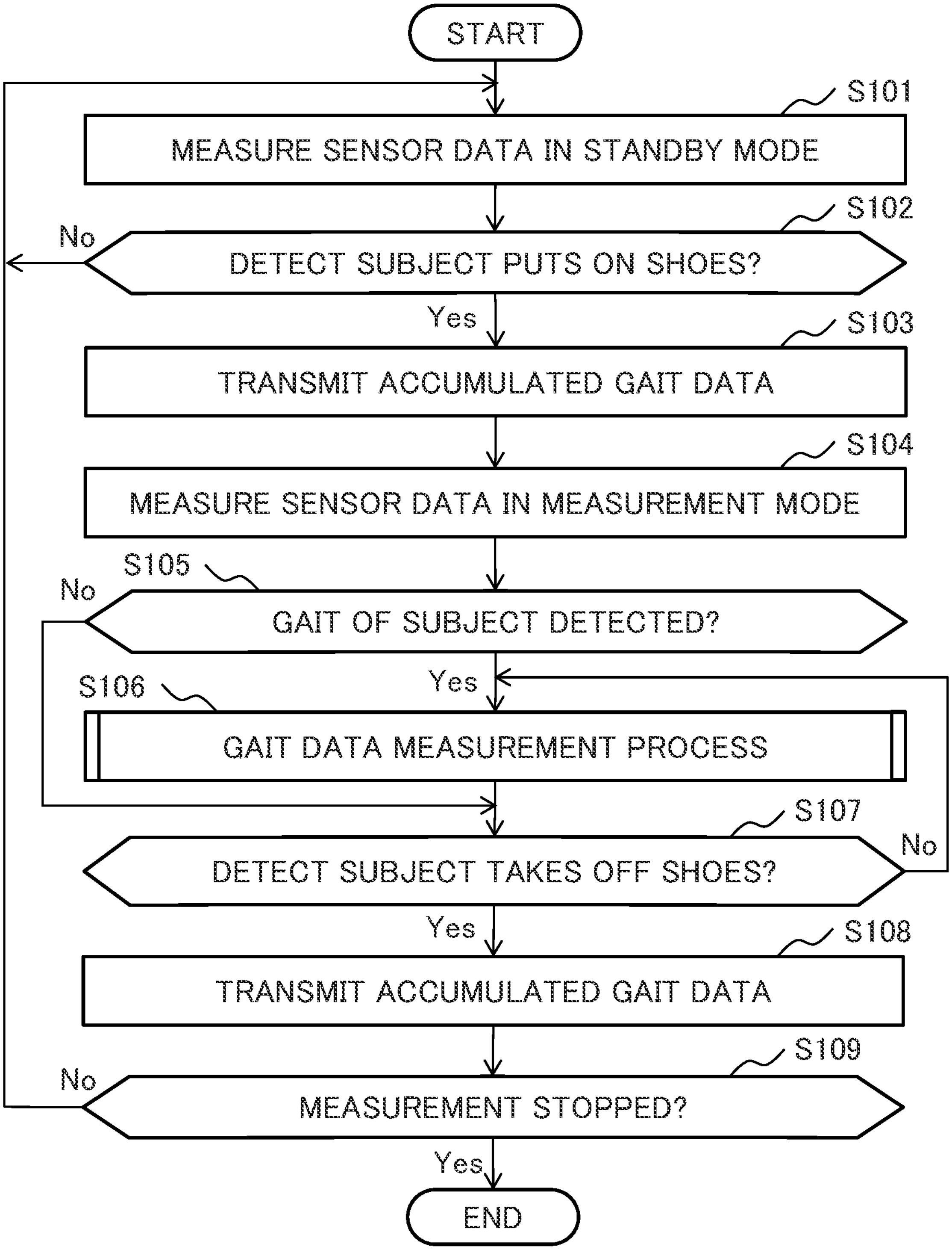
FIG. 7 is a flowchart for explaining an example of the operation of the measurement device included in the measurement system according to the first example embodiment.

FIG. 7 is a flowchart for explaining an example of the operation of the measurement device 10. In the description along the flowchart of FIG. 7, the measurement device 10 will be described as an operation subject.

In FIG. 7, first, the measurement device 10 measures sensor data in a standby mode (step S101). The standby mode is an operation mode of low power consumption for detecting whether the shoes are put on or taken off. In the standby mode, the measurement device 10 measures the sensor data at a sparse measurement interval as compared with a measurement mode. That is, in the standby mode, the measurement device 10 measures the sensor data at a measurement interval longer than that in the measurement mode. In the standby mode, the measurement device 10 may measure only the spatial acceleration/spatial angular velocity used for detecting whether the shoes are put on or taken off.

Next, the measurement device 10 determines whether the subject puts on the shoes (step S102). When detecting the subject puts on the shoes (Yes in step S102), the measurement device 10 transmits the accumulated gait data (step S103). The gait data transmitted from the measurement device 10 is received by the data relay device 15. At this stage, there is a possibility that the gait data is not accumulated in the measurement device 10. In such a case, the measurement device 10 may be configured to transmit a signal (also referred to as a footwear put-on notification signal) making a notification that the subject puts on the shoes. The data relay device 15 can execute a procedure in accordance with the timing at which the subject goes out by receiving the footwear put-on notification signal. When not detecting the subject puts on the shoes (No in step S102), the process returns to step S101.

After step S103, the measurement device 10 measures the sensor data in the measurement mode (step S104). The measurement device 10 measures the sensor data at a dense measurement interval as compared with the measurement mode. That is, in the measurement mode, the measurement device 10 measures the sensor data at a measurement interval shorter than that in the standby mode. In the measurement mode, the measurement device 10 measures all spatial acceleration/spatial angular velocities used for estimating the physical condition.

Next, the measurement device 10 determines the gait of the subject (step S105). When the gait of the subject is detected (Yes in step S105), the measurement device 10 executes a gait data measurement process (step S106). In the gait data measurement process, the measurement device 10 measures the gait data using the sensor data measured by the sensor 11. Details of the gait data measurement process will be described later in detail. When the gait of the subject is not detected (No in step S105), the process proceeds to step S107.

After step S106 or in the case of No in step S105, the measurement device 10 determines whether the subject takes off the shoes (step S107). When detecting the subject takes off the shoes (Yes in step S107), the measurement device 10 transmits the accumulated gait data (step S108). At this stage, the gait data based on the sensor data measured by the measurement device 10 is accumulated in the measurement device 10 according to the gait of the subject who goes out. When not detecting the subject takes off the shoes (No in step S107), the process returns to step S106.

When the measurement is stopped after step S108 (Yes in step S109), the process according to the flowchart of FIG. 7 ends. When the measurement is continued (No in step S109), the process returns to step S101. The determination criterion of stop/continuation of measurement may be set in advance.

<Gait Data Measurement Process>

Next, details of the gait data measurement process (step S106) in the flowchart of FIG. 8 will be described with reference to the drawings. In the description along the flowchart of FIG. 8, the measurement device 10 will be described as an operation subject.

In FIG. 8, first, the measurement device 10 extracts a gait waveform for one gait cycle from the time series data of the sensor data (step S121). For example, the measurement device 10 detects the heel contact and the toe off from the time series data of the sensor data. The measurement device 10 extracts time series data of a section between consecutive heel contacts as a gait waveform for one gait cycle.

Next, the measurement device 10 normalizes the extracted gait waveform for one gait cycle (step S122). The measurement device 10 normalizes a gait waveform for one gait cycle to a gait cycle of 0 to 100% (first normalization). Furthermore, the measurement device 10 normalizes the ratio of the stance phase to the swing phase in the gait waveform subjected to the first normalization for one gait cycle to 60:40 (second normalization). The normalized gait waveform is referred to as gait waveform data.

Next, the measurement device 10 extracts a feature amount used for estimating the physical condition from the normalized gait waveform data (step S123). The extracted feature amount is set according to the physical condition to be estimated.

Next, the measurement device 10 generates a feature amount for each gait phase cluster using the extracted feature amount (step S124).

Next, the measurement device 10 integrates the feature amounts for respective gait phase clusters to generate gait data for one gait cycle (step S125).

Next, the measurement device 10 records the generated gait data as gait data (step S126). After step S126, the process proceeds to step S107 in the flowchart of FIG. 7.

[Data Relay Device]

Figure 9:
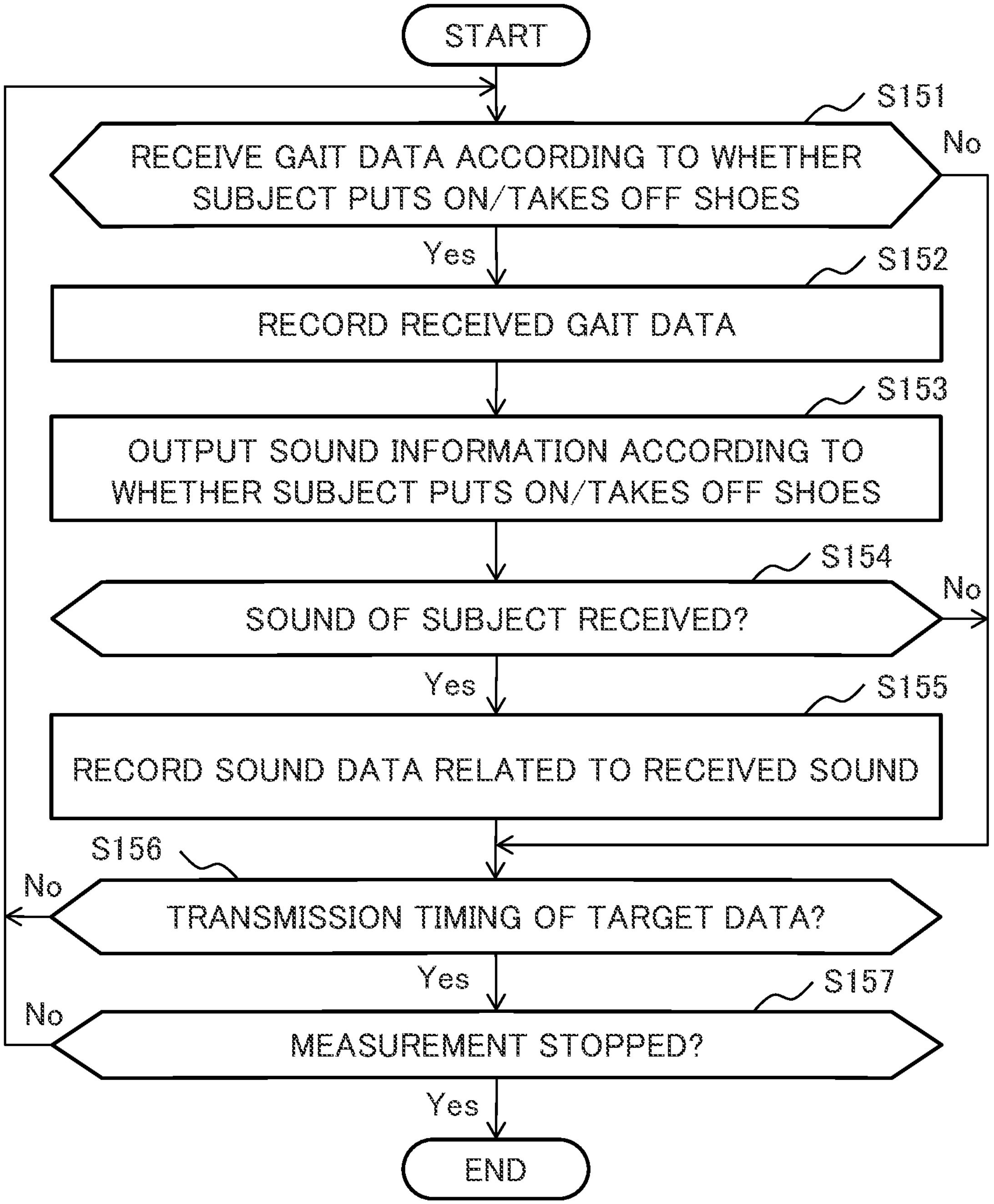
FIG. 9 is a flowchart for explaining an example of the operation of the data relay device included in the measurement system according to the first example embodiment.

FIG. 9 is a flowchart for describing an example of an operation of the data relay device 15. In the description along the flowchart of FIG. 9, the data relay device 15 will be described as an operation subject.

In FIG. 9, first, the data relay device 15 determines whether the subject puts on/takes off the shoes (step S151). When the gait data according to whether the subject puts on/takes off the shoes is received (Yes in step S151), the data relay device 15 records the received gait data (step S152). When receiving the footwear put-on notification signal from the measurement device 10, the data relay device 15 may record the reception time of the footwear put-on notification signal. The reception time of the footwear put-on notification signal corresponds to the time when the subject goes out. When the gait data according to whether the subject puts on/takes off the shoes is not received (No in step S151), the process proceeds to step S156. The determination on whether the subject puts on/takes off the shoes may be performed at a preset timing.

Next to step S152, the data relay device 15 outputs the sound information to the subject according to whether the subject puts on/takes off the shoes (step S153). For example, in a case where the gait data according to the fact that the subject puts on the shoes is received, the data relay device 15 outputs sound information such as “Take care”. For example, in a case where the gait data according to the fact that the subject takes off the shoes is received, the data relay device 15 outputs sound information such as “Welcome home”. The sound information output from the data relay device 15 is not particularly limited.

After step S153, when receiving the sound of the subject (Yes in step S154), the data relay device 15 records sound data related to the received sound (step S155). The data relay device 15 records the time when the sound data is received in association with the sound data. The data relay device 15 records target data in which the gait data accumulated at the time of receiving the sound data and the sound data are associated with each other.

After step S155, or in the case of No in step S151 or No in step S154, when it is the transmission timing of the target data (Yes in step S156), the process proceeds to step S157. When it is not the transmission timing of the target data (No in step S156), the process returns to step S151.

When the determination is Yes in step S156 and the measurement is stopped (Yes in step S157), the process according to the flowchart of FIG. 9 ends. When the measurement is continued (No in step S157), the process returns to step S151. The determination criterion of stop/continuation of measurement may be set in advance.

As described above, the measurement system of the present example embodiment includes the measurement device and the data relay device. The measurement device is mounted in the footwear of the subject. The measurement device includes a sensor and a gait data generation unit. The sensor measures the spatial acceleration and the spatial angular velocity. The sensor generates sensor data related to the motion of the foot using the measured spatial acceleration and the measured spatial angular velocity. The sensor outputs the generated sensor data. The gait data generation unit acquires time series data of the sensor data. The gait data generation unit extracts a feature amount regarding the gait from the time series data of the sensor data. The gait data generation unit generates gait data including the extracted feature amount. The gait data generation unit transmits the generated gait data to the data relay device.

The data relay device includes a communication unit, a sound input/output unit, a storage unit, and an output unit. The communication unit receives the gait data. The gait data includes a feature amount extracted from the sensor data related to the motion of the foot measured by the measurement device mounted in the footwear of the subject. The sound input/output unit outputs a sound to the subject in response to reception of the gait data. The storage unit stores the received gait data. The output unit outputs target data including the gait data stored in the storage unit at a preset transmission timing.

The data relay device of the present example embodiment outputs a sound to the subject in response to reception of the gait data measured according to the gait of the subject. The timing of the transmission of the gait data of the subject substantially coincides with a timing at which the subject puts on or take off the footwear. The subject puts on the footwear at the timing when the subject goes out. On the other hand, the subject takes off the footwear at the timing when the subject comes home. The period in which the subject goes out includes a period in which the subject walks. The gait data measured according to the gait of the subject is transmitted to the data relay device at the timing when the subject goes out/comes home. Therefore, according to the present example embodiment, the gait data acquired according to the gait of the subject can be accurately collected in accordance with the daily life of the subject.

In an aspect of the present example embodiment, the sound input/output unit generates sound data related to the sound of the subject. The sound input/output unit stores the generated sound data in the storage unit. The output unit outputs target data including the gait data and the sound data stored in the storage unit at a preset transmission timing. The sound data of the subject is acquired at the timing when the subject goes out/comes home. Therefore, according to the present aspect, the target data including the sound data acquired in accordance with the daily life of the subject can be accurately collected.

In an aspect of the present example embodiment, the communication unit receives a put-on/take-off signal indicating whether the subject puts on or takes off the footwear. The sound input/output unit outputs a sound to the subject according to the put-on/take-off signal. In the present aspect, a sound is output to the subject in accordance with whether the subject puts on or takes off the footwear. Therefore, according to the present aspect, it is possible to output a sound in accordance with whether the subject puts on or takes off the footwear.

In an aspect of the present example embodiment, the put-on/take-off signal includes information indicating the footwear is put on and taken off. In a case where the put-on/take-off signal indicates the footwear is put on, the sound input/output unit outputs a sound related to the subject going out. In a case where the put-on/take-off signal indicates the footwear is taken off, the sound input/output unit outputs a sound related to the subject coming home. In the present aspect, it is possible to distinguish between the subject going out and the subject coming home according to the put-on/take-off signal including the information indicating the footwear is put on and taken off. Therefore, according to the present aspect, it is possible to output an appropriate sound from the data relay device according to the subject going-out/coming home.

Second Example Embodiment

Next, a measurement system according to the second example embodiment will be described with reference to the drawings. The measurement system of the present example embodiment has a configuration in which a human sensor is added to the measurement system of the first example embodiment.

(Configuration)

Figure 10:
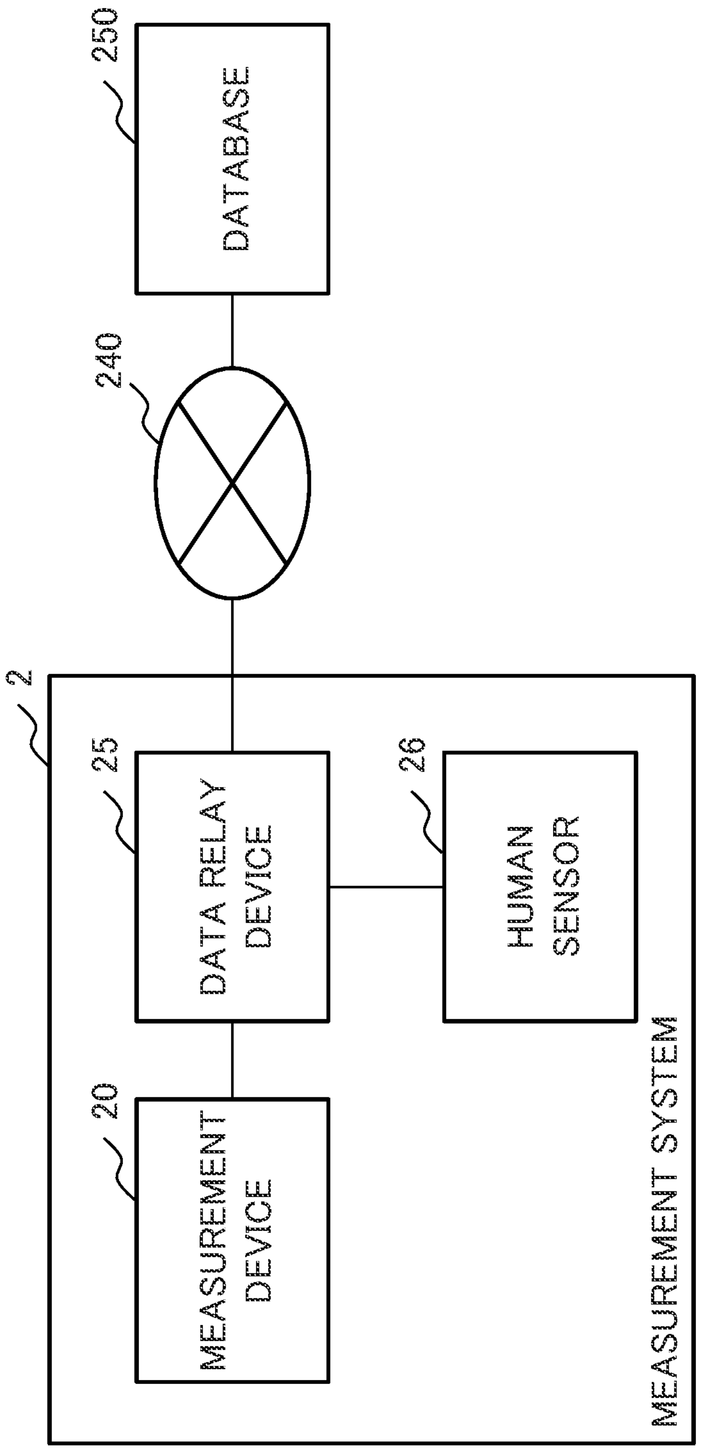
FIG. 10 is a block diagram illustrating an example of a configuration of a measurement system according to a second example embodiment.

FIG. 10 is a block diagram illustrating an example of a configuration of a measurement system 2 according to the present example embodiment. The measurement system 2 includes a measurement device 20, a data relay device 25, and a human sensor 26. The data relay device 25 is connected to a database 250 via a network 240 such as an intranet or the Internet. The data relay device 25 transmits the gait data accumulated in the data relay device 25 to the database 250 at a preset timing. Hereinafter, an outline of the measurement system 2 will be described, and then a configuration of the data relay device 25 will be described. Since the configuration of the measurement device 20 is similar to that of the first example embodiment, it is omitted.

Figure 11:
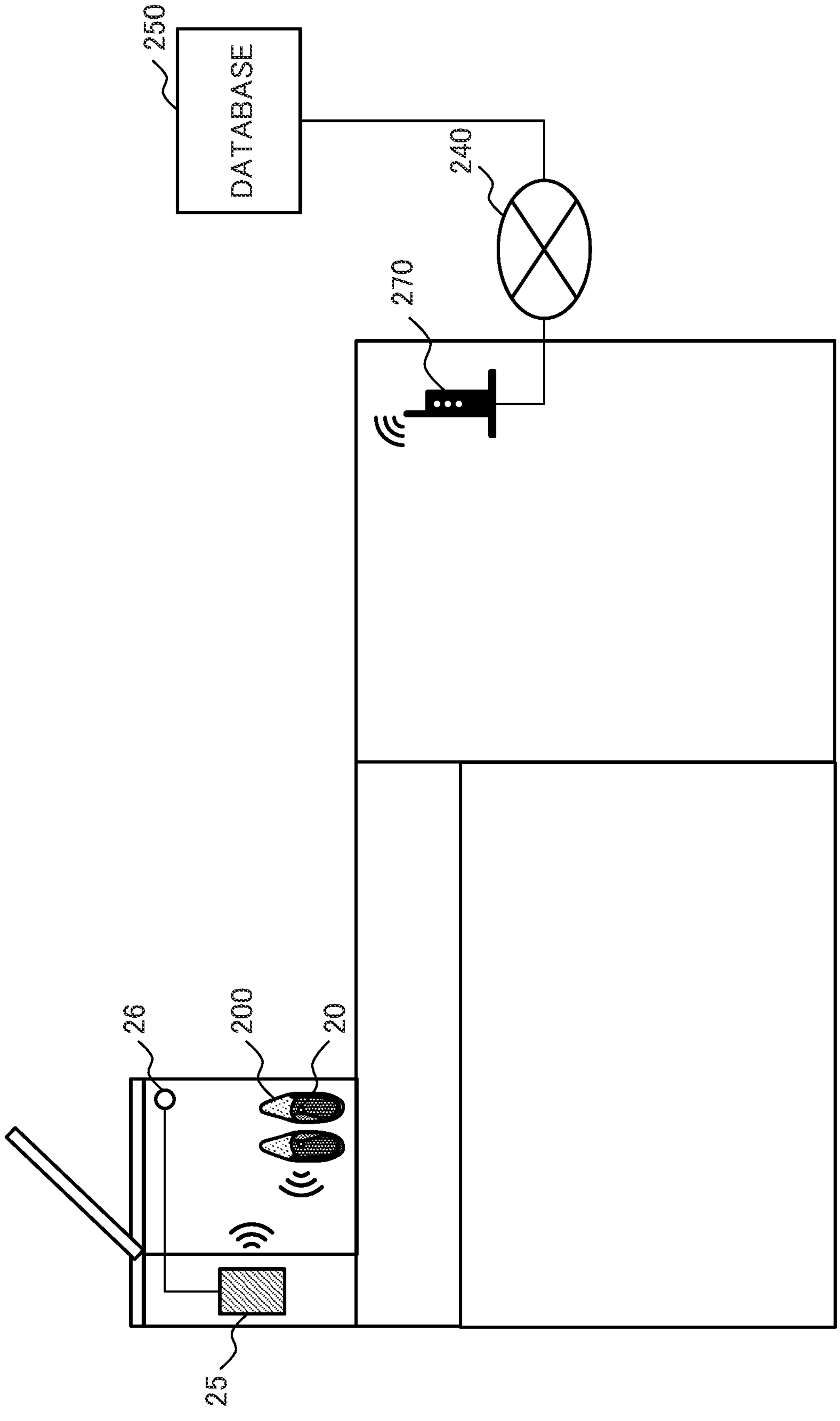
FIG. 11 is a conceptual diagram illustrating an installation example of the measurement system according to the second example embodiment.

FIG. 11 is a conceptual diagram illustrating an arrangement example of the measurement system 2. FIG. 11 is a diagram of part of the floor plan of the residence of the subject viewed from an upper viewing. The measurement device 20, the data relay device 25, and the human sensor 26 constituting the measurement system 2 are disposed at the entrance of the subject's residence. The measurement device 20 is disposed on the shoe 200 of the subject. The data relay device 25 is disposed on a shoebox at the entrance. Human sensor 26 is disposed above the front door. FIG. 11 illustrates an example of the arrangement of the measurement system 2, and does not limit the arrangement of the measurement system 2. For example, the data relay device 25 transmits the accumulated target data to a router 270 disposed in another room at a predetermined timing. The router 270 transmits the received target data to the database 250 via the network 240.

Human sensor 26 is disposed near data relay device 25. Human sensor 26 is connected to data relay device 25. For example, the human sensor 26 is connected to the data relay device 25 by wireless communication. The human sensor 26 may be connected to the data relay device 25 by wired communication. A connection method between human sensor 26 and data relay device 25 is not particularly limited.

Human sensor 26 detects a person who has entered the detection range. In response to detection of the person, the human sensor 26 outputs a signal (also referred to as a detection signal) making a notification that the person has been detected to the data relay device 25. For example, human sensor 26 detects a person by infrared rays such as a thermopile and an infrared sensor. The configuration of human sensor 26 is not particularly limited. For example, human sensor 26 may be configured to detect a person by a wave such as a sound wave or vibration.

The data relay device 25 receives the detection signal from the human sensor 26. The data relay device 25 is connected to the measurement device 20. The data relay device 25 transmits a data request signal to the measurement device 20 in response to reception of the detection signal transmitted from the human sensor 26. For example, the data relay device 25 is connected to the measurement device 20 by wireless communication. The data relay device 25 may be connected to the measurement device by wired communication. A connection system between the data relay device 25 and the measurement device 20 is not particularly limited.

The measurement device 20 is mounted in the footwear of the subject. The measurement device 20 receives a data request signal from the data relay device 25 in a situation where the measurement device is located within a communication range with the data relay device 25. The measurement device 20 transmits the accumulated gait data to the data relay device 25 in response to the data request signal.

The data relay device 25 receives the gait data transmitted from the measurement device 20 in response to the data request signal. The data relay device 25 accumulates the received gait data. Upon receiving the gait data, the data relay device 25 outputs a sound to the subject. When the gait data transmitted from the measurement device 20 is received at the timing when the subject puts on the shoes, the data relay device 25 outputs a sound directed to the subject who goes out. When the gait data transmitted from the measurement device 20 is received at the timing when the subject takes off the shoes, the data relay device 25 outputs a sound directed to the subject who has come home.

The data relay device 25 receives a sound emitted from the subject with respect to a sound output to the subject. The data relay device 25 converts a received sound into sound data. The data relay device 25 stores the converted sound data. The sound data is preferably stored in association with the time when the sound is received. When the sound data is stored in association with the time, the time when the subject goes out/comes home can be determined.

The data relay device 25 may be configured to estimate a feeling and a fatigue level of the subject according to the sound of the subject. For example, the data relay device 25 is trained in advance in the feeling and the fatigue level according to the frequency and the tone of the subject's sound using a machine training method. In this way, it is possible to estimate the feeling and the fatigue level of the subject according to the input of the sound of the subject. The data relay device 25 may be configured to estimate the state of the subject by performing text analysis of the response content of the subject. With such a configuration, it is also possible to estimate delight, anger, sorrow, and pleasure according to the text included in the response content of the subject.

The data relay device 25 transmits the target data to the database 250 constructed in the cloud or the server via the network 240. The target data is a generic term for gait data and sound data. In a case where the sound data of the subject is stored, the data relay device 25 transmits the sound data to the database 250 in addition to the gait data. The target data accumulated in the database 250 is used for estimating the physical condition of the subject and the like. The use of the target data accumulated in the database 250 is not limited. For example, the data relay device 25 may transmit target data to a terminal device (not illustrated) handled by a care support specialist or the like in charge of a subject who needs care/support.

[Data Relay Device]

Figure 12:
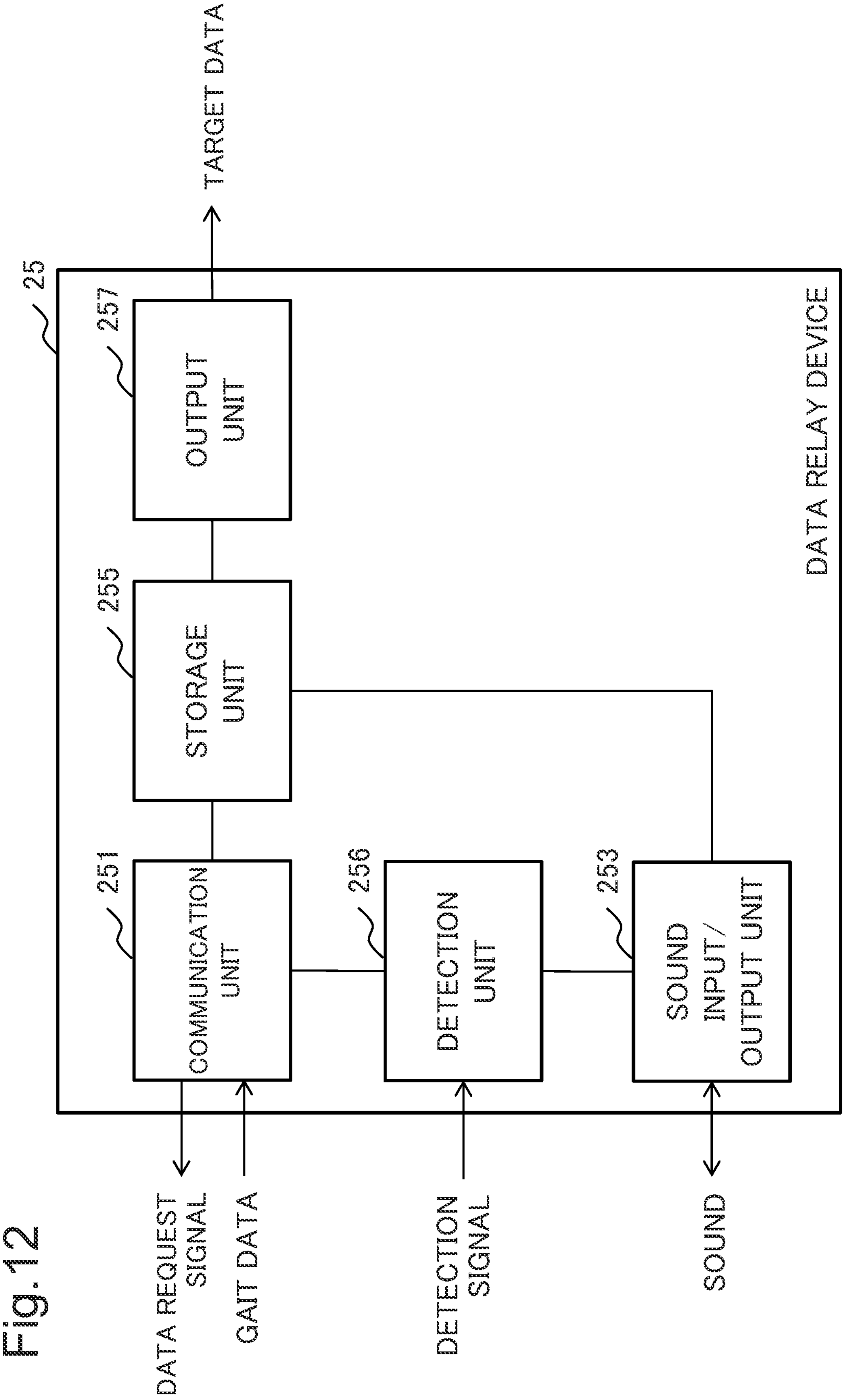
FIG. 12 is a block diagram illustrating an example of a configuration of a data relay device included in the measurement system according to a second example embodiment.

FIG. 12 is a block diagram illustrating an example of a configuration of the data relay device 25. The data relay device 25 includes a communication unit 251, a sound input/output unit 253, a storage unit 255, a detection unit 256, and an output unit 257.

The communication unit 251 transmits a data request signal in response to reception of the detection signal by the detection unit 256. The data request signal transmitted from the communication unit 251 is transmitted to the measurement device 20. The communication unit 251 receives the gait data transmitted from the measurement device 20 in response to the data request signal. The communication unit 251 stores the received gait data in the storage unit 255. The communication unit 251 communicates with the measurement device 20 by a common communication method.

The sound input/output unit 253 has the similar configuration as the sound input/output unit 153 of the first example embodiment. The sound input/output unit 253 includes a speaker that outputs a sound and a microphone that receives a sound. The sound input/output unit 253 outputs a sound to the subject in response to reception of the gait data. The sound data to be converted into a sound to the subject may be stored in the storage unit 255. When the gait data transmitted from the measurement device 20 is received at the timing when the subject puts on the shoes, the sound input/output unit 253 outputs a sound directed to the subject who goes out. When the gait data transmitted from the measurement device 20 is received at the timing when the subject takes off the shoes, the sound input/output unit 253 outputs a sound directed to the subject who has come home. In a case where only sound output is performed, the microphone may be omitted.

The sound input/output unit 253 receives a sound uttered by the subject with respect to a sound output to the subject. The sound input/output unit 253 converts a received sound into sound data. The sound data is digital data. The sound input/output unit 253 stores the converted sound data in the storage unit 255. The sound data is preferably stored in association with the time when the sound is received. Therefore, the data relay device 25 preferably includes a clock such as a real-time clock. When the sound data is stored in association with the time, the time when the subject goes out/comes home can be determined.

The storage unit 255 has the similar configuration as the storage unit 155 of the first example embodiment. The storage unit 255 stores gait data and sound data. The gait data and the sound data stored in the storage unit 255 are collectively referred to as target data. The storage unit 255 accumulates the target data at the transmission interval of the target data by the output unit 257. The target data accumulated in the storage unit 255 is output at a transmission timing of the target data. The target data accumulated in the storage unit 255 is deleted in accordance with the transmission of the target data. For example, a situation in which the transmitted target data does not reach the database 250 is also assumed. Therefore, the target data accumulated in the storage unit 255 may be deleted after the signal making a notification of the reception of the target data is acquired from the database 250.

The detection unit 256 receives the detection signal from the human sensor 26. Upon receiving the detection signal, the detection unit 256 outputs a transmission instruction of the data request signal to the communication unit 251. The detection signal is a signal for making a notification that a person has entered the detection range of human sensor 26. The detection signal may be transmitted in response to detection of an animal or the like instead of a person. Therefore, even when the data request signal is transmitted in response to reception of the detection signal, a response (gait data) from the measurement device 20 may not be received.

The output unit 257 has the similar configuration as the output unit 157 of the first example embodiment. The output unit 257 is a communication interface that transmits the target data. The output unit 257 transmits the target data to the database 250 constructed in the cloud or the server via the network 240. The target data accumulated in the database 250 is used for estimating the physical condition of the subject and the like. The use of the gait data accumulated in the database 250 is not limited. The output unit 257 may be a general-purpose interface conforming to a standardized standard instead of the communication interface. The output unit 257 may be an interface capable of reading and writing data on a recording medium, instead of a communication interface.

(Operation)

Next, an operation of the measurement system 2 will be described with reference to the drawings. The measurement device 20 and the data relay device 25 included in the measurement system 2 will be individually described. The operation of human sensor 26 will not be described.

[Measurement Device]

Figure 13:
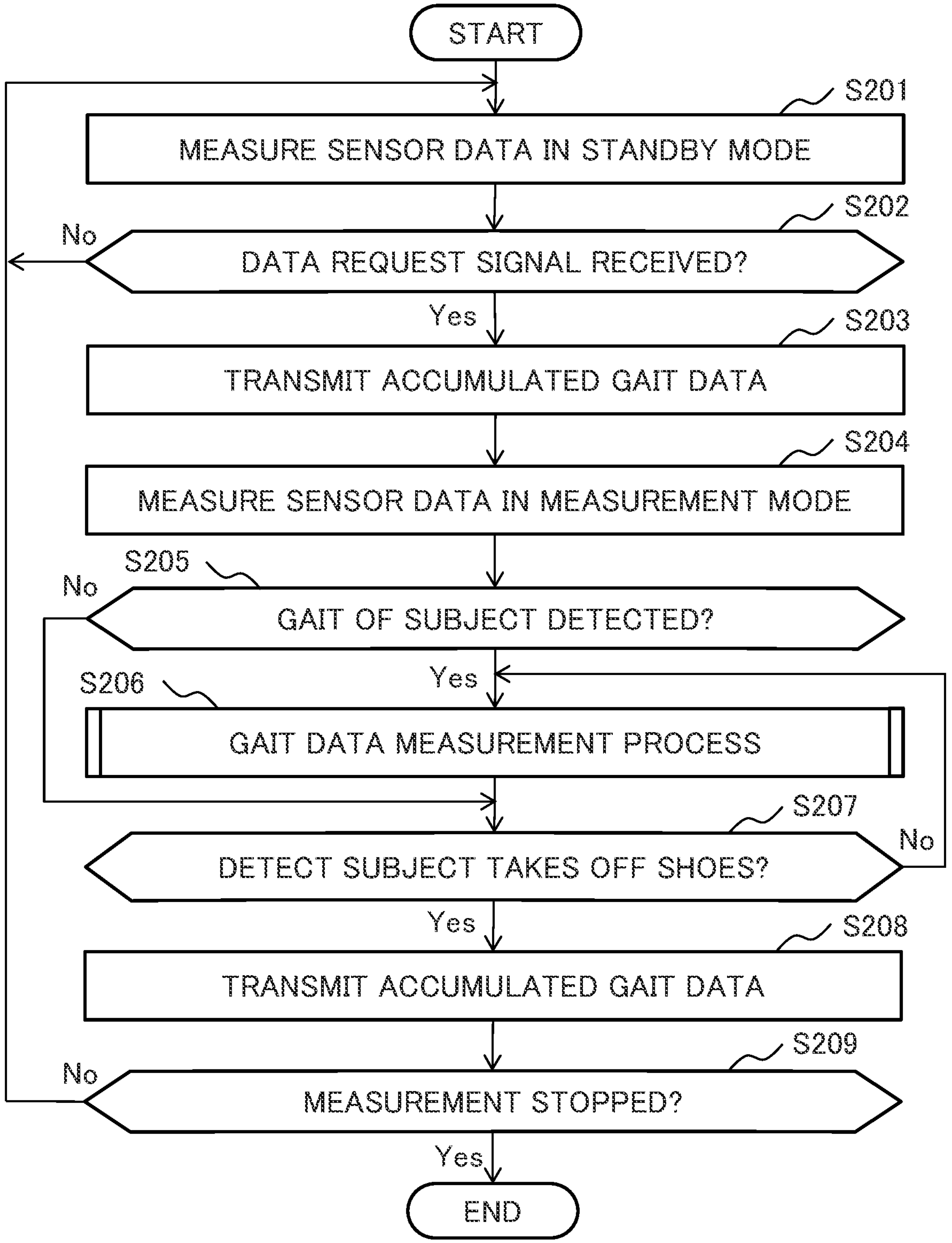
FIG. 13 is a flowchart for explaining an example of the operation of the measurement device included in the measurement system according to the second example embodiment.

FIG. 13 is a flowchart for explaining an example of the operation of the measurement device 20. In the description along the flowchart of FIG. 13, the measurement device 20 will be described as an operation subject.

In FIG. 13, first, the measurement device 20 measures sensor data in a standby mode (step S201). The standby mode is an operation mode of low power consumption in a stage where the data request signal is not received. In the standby mode, the measurement device 20 measures the sensor data at a sparse measurement interval as compared with the measurement mode. That is, in the standby mode, the measurement device 20 measures the sensor data at a longer measurement interval than in the measurement mode. The measurement device 20 may be set to be activated in response to reception of the data request signal.

When receiving the data request signal (Yes in step S202), the measurement device 20 transmits the accumulated gait data (step S203). The gait data transmitted from the measurement device 20 is received by the data relay device 25. At this stage, there is a possibility that the gait data is not accumulated in the measurement device 20. In such a case, the measurement device 20 may be configured to transmit a signal (also referred to as a footwear put-on notification signal) making a notification that the subject puts on the footwear. The data relay device 25 can execute a procedure in accordance with the timing at which the subject goes out by receiving the footwear put-on notification signal. When the data request signal is not received (No in step S202), the process returns to step S201.

After step S203, the measurement device 20 measures the sensor data in a measurement mode (step S204). The measurement device 20 measures the sensor data at a dense measurement interval as compared with the measurement mode. That is, in the measurement mode, the measurement device 20 measures the sensor data at a measurement interval shorter than that in the standby mode. In the measurement mode, the measurement device 20 measures all spatial acceleration/spatial angular velocities used for estimating the physical condition. The measurement device 20 may be activated in response to reception of the data request signal and set to measure the spatial acceleration/spatial angular velocity.

When the gait of the subject is detected (Yes in step S205), the measurement device 20 executes a gait data measurement process (step S206). In the gait data measurement process, the measurement device 20 measures the gait data using the sensor data measured by the measurement device 20. The gait data measurement process in step S206 is similar to the gait data measurement process (FIG. 8) in the first example embodiment. When the gait of the subject is not detected (No in step S205), the process proceeds to step S207.

After step S206 or in the case of No in step S205, the measurement device 20 determines whether the subject takes off the shoes (step S207). When detecting the subject takes off the shoes (Yes in step S207), the measurement device 20 transmits the accumulated gait data (step S208). At this stage, the gait data based on the sensor data measured by the measurement device 20 is accumulated in the measurement device 20 according to the gait of the subject who goes out. When not detecting the subject takes off the shoes (No in step S207), the process returns to step S206. Whether the subject puts on the shoes may be determined in accordance with detection of a person by the human sensor 26.

When the measurement is stopped after step S208 (Yes in step S209), the process according to the flowchart of FIG. 13 ends. When the measurement is continued (No in step S209), the process returns to step S201. The determination criterion of stop/continuation of measurement may be set in advance.

[Data Relay Device]

Figure 14:
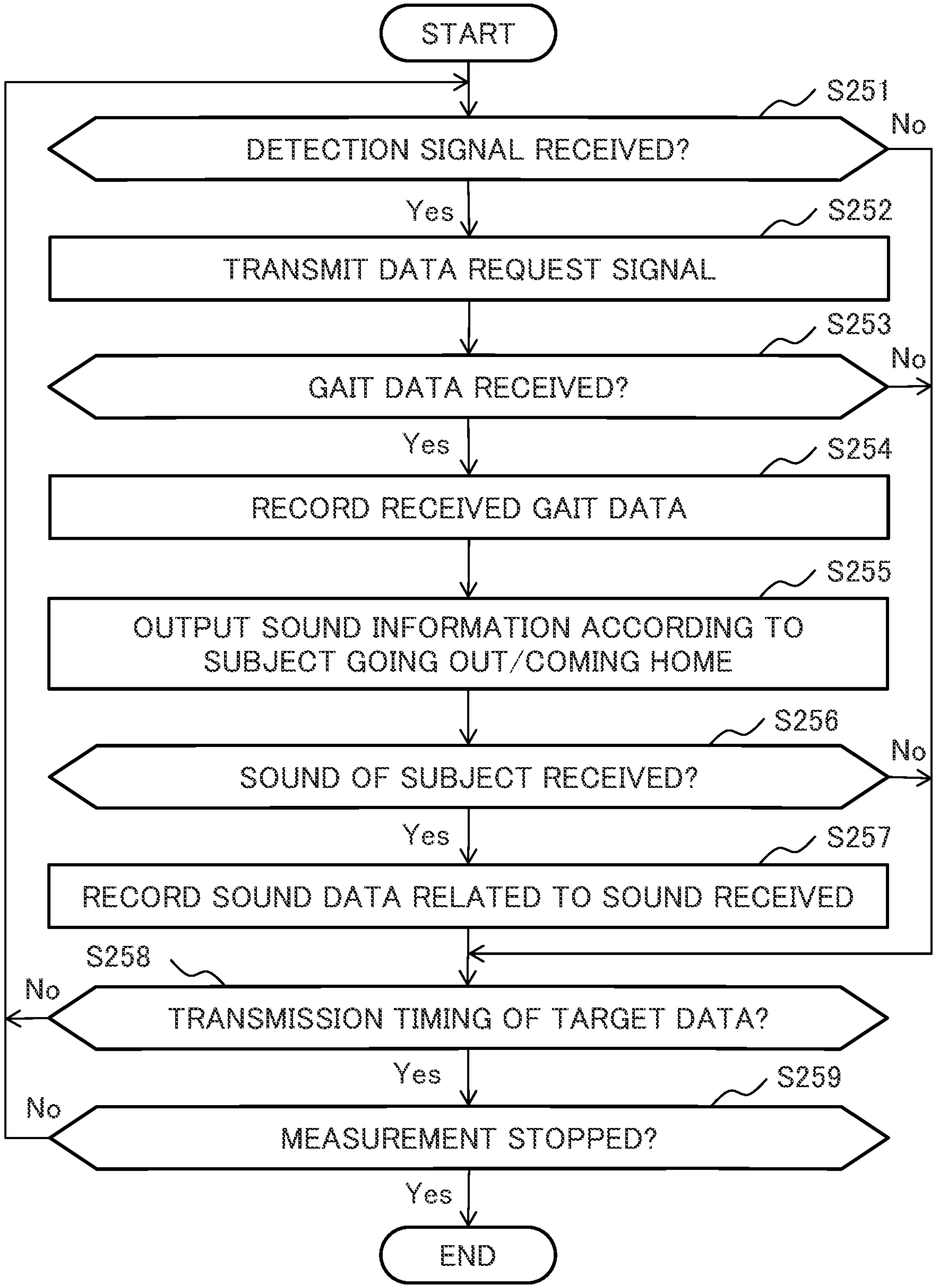
FIG. 14 is a flowchart for explaining an example of the operation of the data relay device included in the measurement system according to the second example embodiment.

FIG. 14 is a flowchart for explaining an example of the operation of the data relay device 25. In the description along the flowchart of FIG. 14, the data relay device will be described as an operation subject.

In FIG. 14, when receiving the detection signal from the human sensor 26 (Yes in step S251), the data relay device 25 transmits a data request signal to the measurement device 20 (step S252). When the detection signal is not received from the human sensor 26 (No in step S251), the process proceeds to step S258.

When the gait data is received after step S252 (Yes in step S253), the data relay device 25 records the received gait data (step S254). When receiving the footwear put-on notification signal from the measurement device 20, the data relay device 25 may record the reception time of the footwear put-on notification signal. The reception time of the footwear put-on notification signal corresponds to the time when the subject goes out. When the gait data has not been received (No in step S253), the process proceeds to step S258.

Next to step S254, the data relay device 25 outputs the sound information to the subject according to whether the subject puts on/takes off the shoes (step S255). For example, in a case where the gait data according to the fact that the subject puts on the shoes is received, the data relay device 25 outputs sound information such as "Take care". For example, in a case where the gait data according to the fact that the subject takes off the shoes is received, the data relay device 25 outputs sound information such as "Welcome home". The sound information output from the data relay device 25 is not particularly limited.

After step S255, when receiving the sound of the subject (Yes in step S256), the data relay device 25 records sound data related to the received sound (step S257). The data relay device 25 records the time when the sound data is received in association with the sound data. The data relay device 25 records target data in which the gait data accumulated at the time of receiving the sound data and the sound data are associated with each other.

After step S257, or in the case of No in step S251, step S253, or step S256, when it is the transmission timing of the target data (Yes in step S258), the process proceeds to step S259. When it is not the transmission timing of the target data (No in step S258), the process returns to step S251.

When the determination is Yes in step S258 and the measurement is stopped (Yes in step S259), the process according to the flowchart of FIG. 14 ends. When the measurement is continued (No in step S259), the process returns to step S251. The determination criterion of stop/continuation of measurement may be set in advance.

Application Example

Figure 15:
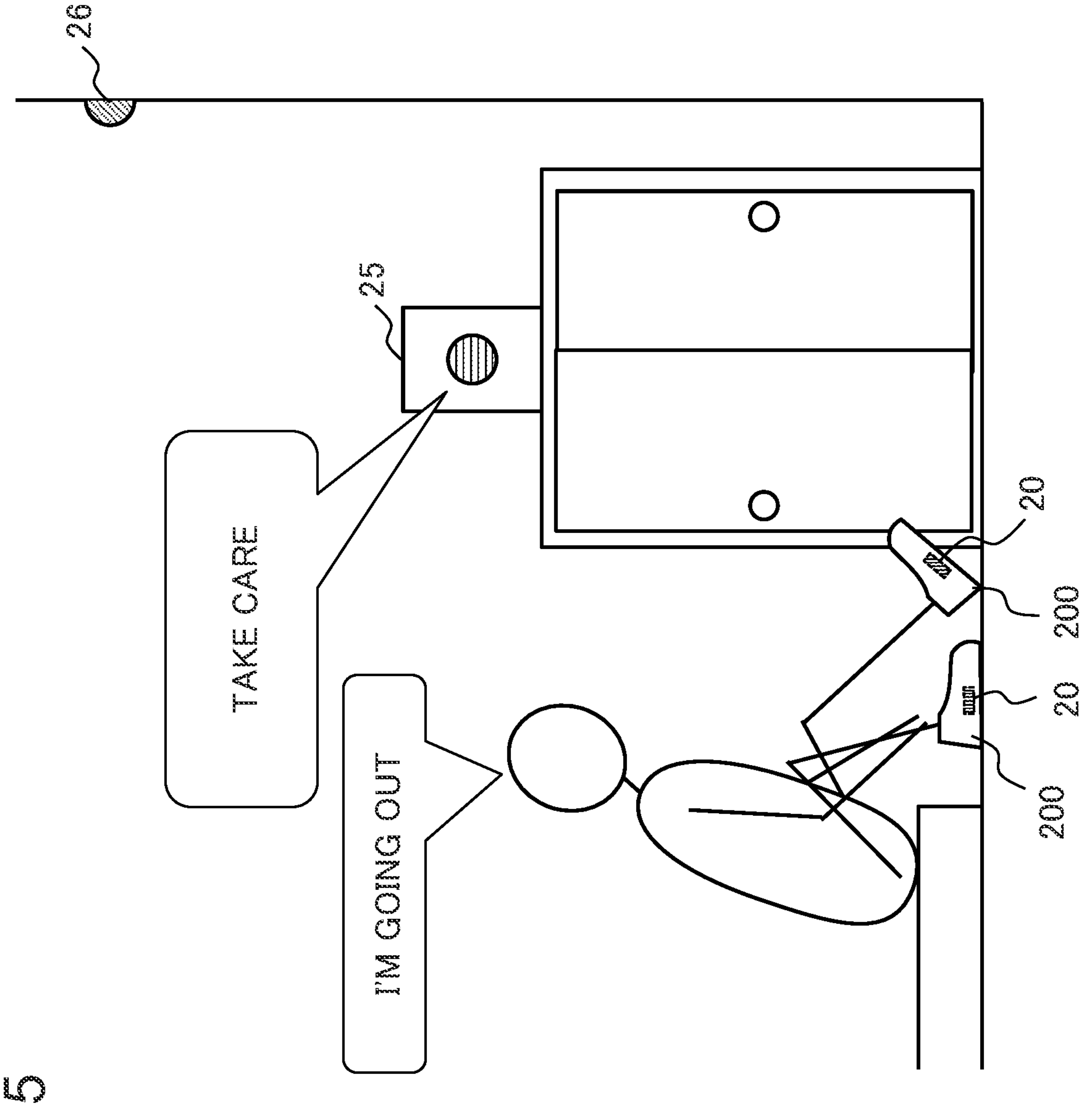
FIG. 15 is a conceptual diagram for describing an application example of the measurement system according to the second example embodiment.
Figure 16:
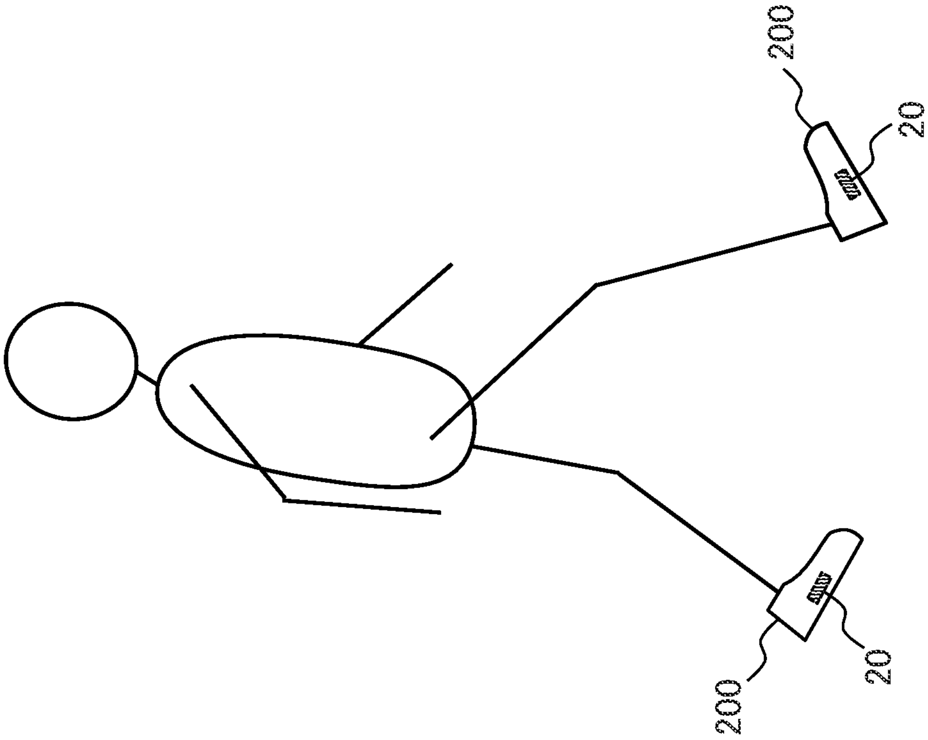
FIG. 16 is a conceptual diagram for describing an application example of the measurement system according to the second example embodiment.
Figure 17:
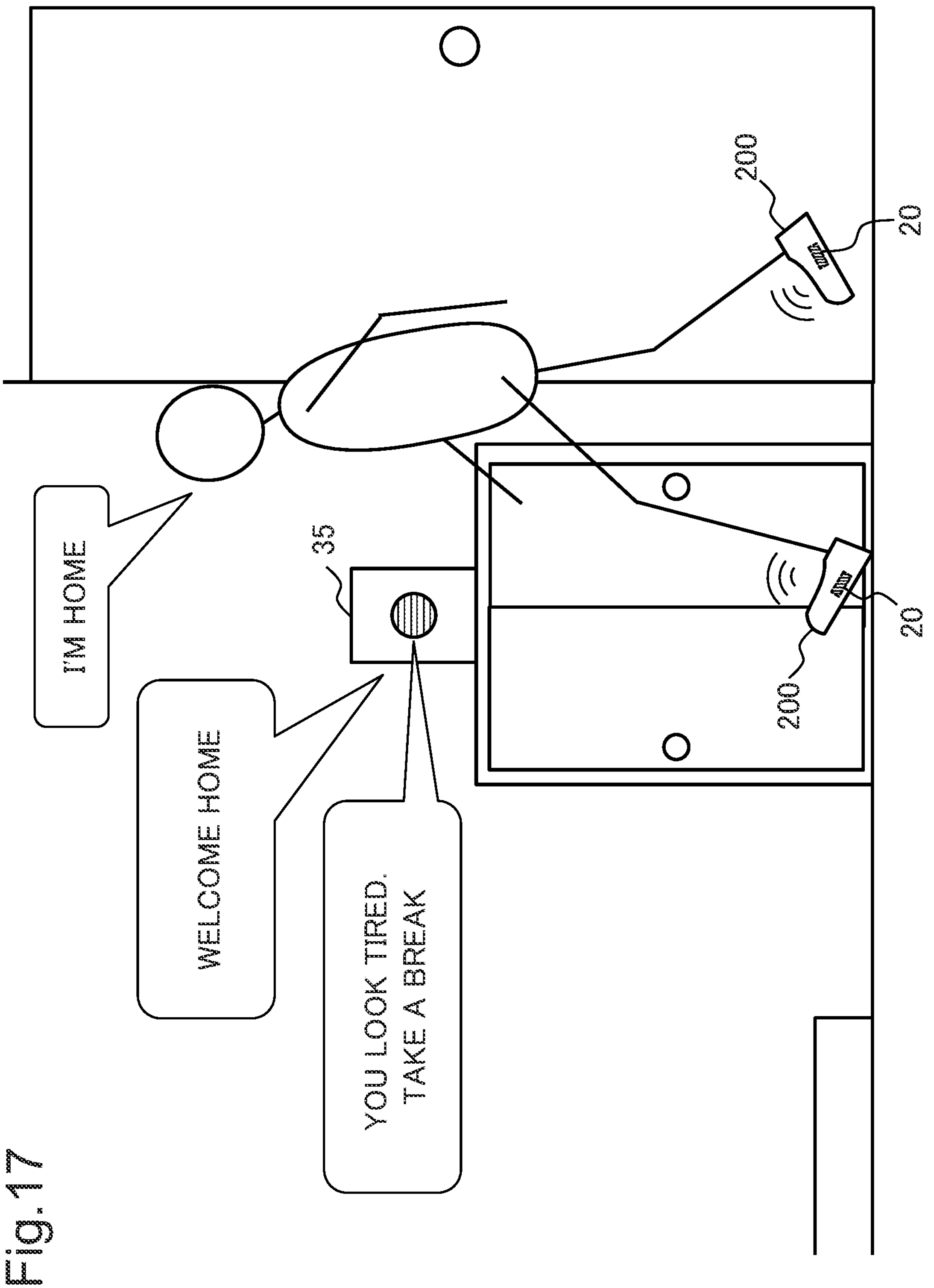
FIG. 17 is a conceptual diagram for describing an application example of the measurement system according to the second example embodiment.

Next, an application example according to the present example embodiment will be described with reference to the drawings. FIGS. 15 to 17 are conceptual diagrams for describing the present application example. In the present application example, the measurement device 20, the data relay device 25, and the human sensor 26 constituting the measurement system 2 are disposed at the entrance of the residence of the subject.

FIG. 15 is a conceptual diagram illustrating a state in which the subject puts on the shoes 200 to go out. The measurement device 20 is mounted inside the shoe 200. The human sensor 26 transmits a detection signal to the data relay device 25 in response to detection of the subject. In response to reception of the detection signal, the data relay device 25 outputs sound information of "Take care". The subject replies saying "I'm going out" in response to the sound information output from the data relay device 25. The data relay device 25 records sound data related to the response by the subject.

FIG. 16 is a conceptual diagram illustrating a state in which the subject who goes out is walking. The measurement device 20 measures sensor data according to the gait of the subject. The measurement device 20 accumulates gait data related to the sensor data.

FIG. 17 is a conceptual diagram illustrating a state in which the subject comes home from the outing. The human sensor 26 transmits a detection signal to the data relay device 25 in response to detection of the subject. In response to reception of the detection signal, the data relay device 25 outputs sound information of "Welcome home". The subject replies saying "I'm home" according to the sound information output from the data relay device 25. The data relay device 25 records sound data related to the response by the subject. Further, the data relay device 25 estimates the state of the subject according to the response of the subject. In the example of FIG. 17, it is assumed that the data relay device 25 estimates that the subject is fatigued from the response of the subject. The data relay device 25 outputs sound information of "You look tired. Take a break" according to the estimation result of the state of the subject. The subject who hears kind words from the data relay device 25 may feel good than when hearing no words.

According to the present application example, the gait data acquired according to the gait of the subject can be accurately collected in accordance with the daily life of the subject. According to the present application example, there is a possibility that quality of life (QOL) of the subject who lives alone can be improved by the action by the sound information from the data relay device 25.

As described above, the measurement system of the present example embodiment includes the measurement device, the data relay device, and the human sensor. The human sensor is disposed near the data relay device. The human sensor transmits a detection signal to the data relay device in response to detection of a person including the subject. In response to reception of the detection signal, the data relay device transmits a data request signal for requesting transmission of the gait data to the measurement device. The measurement device transmits the accumulated gait data to the data relay device in response to the data request signal. The data relay device receives the gait data transmitted in response to the data request signal. The data relay device stores the received gait data.

The data relay device of the present example embodiment acquires the gait data from the measurement device mounted in the footwear of the subject in response to detection of the subject near the data relay device. In a case where the data relay device is disposed at the entrance of the residence of the subject, there is a high possibility that the timing at which the subject comes close to the data relay device is the timing at which the subject goes out/comes home. Therefore, according to the present example embodiment, the gait data acquired according to the gait of the subject can be accurately collected in accordance with the daily life of the subject.

Third Example Embodiment

Next, a data relay device according to the third example embodiment will be described with reference to the drawings. The data relay device of the present example embodiment has a configuration in which the data relay device included in the measurement systems of the first and second example embodiments is simplified.

Figure 18:
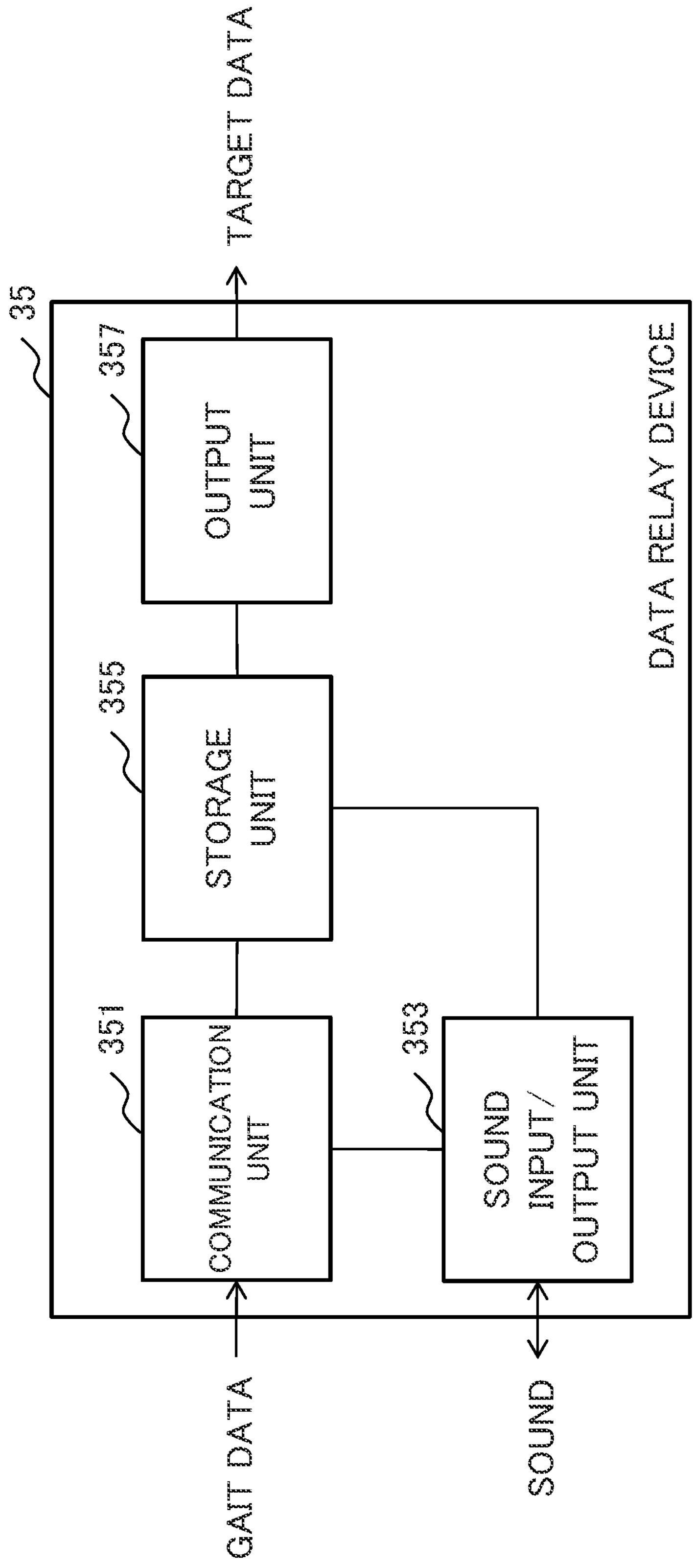
FIG. 18 is a block diagram illustrating an example of a configuration of a data relay device according to a third example embodiment.

FIG. 18 is a block diagram illustrating an example of a configuration of a data relay device 35 according to the present example embodiment. The data relay device 35 includes a communication unit 351, a sound input/output unit 353, a storage unit 355, and an output unit 357.

The communication unit 351 receives the gait data. The gait data includes a feature amount extracted from the sensor data related to the motion of the foot measured by the measurement device mounted in the footwear of the subject. The sound input/output unit 353 outputs a sound to the subject in response to reception of the gait data. The storage unit 355 stores the received gait data. The output unit 357 outputs target data including the gait data stored in the storage unit at a preset transmission timing.

As described above, the data relay device of the present example embodiment outputs a sound to the subject in response to reception of the gait data measured according to the gait of the subject. The timing of the transmission of the gait data of the subject substantially coincides with a timing at which the subject puts on or take off the footwear. The subject puts on the footwear at the timing when the subject goes out. On the other hand, the subject takes off the footwear at the timing when the subject comes home. The period in which the subject goes out includes a period in which the subject walks. The gait data measured according to the gait of the subject is transmitted to the data relay device at the timing when the subject goes out/comes home. Therefore, according to the present example embodiment, the gait data acquired according to the gait of the subject can be accurately collected in accordance with the daily life of the subject.

(Hardware)

Regarding a hardware configuration that executes control and processing according to each example embodiment of the present disclosure, the information processing device 90 (computer) in FIG. 19 will be described as an example. The information processing device 90 in FIG. 19 is a configuration example for executing control and processing of each example embodiment, and does not limit the scope of the present disclosure.

Figure 19:
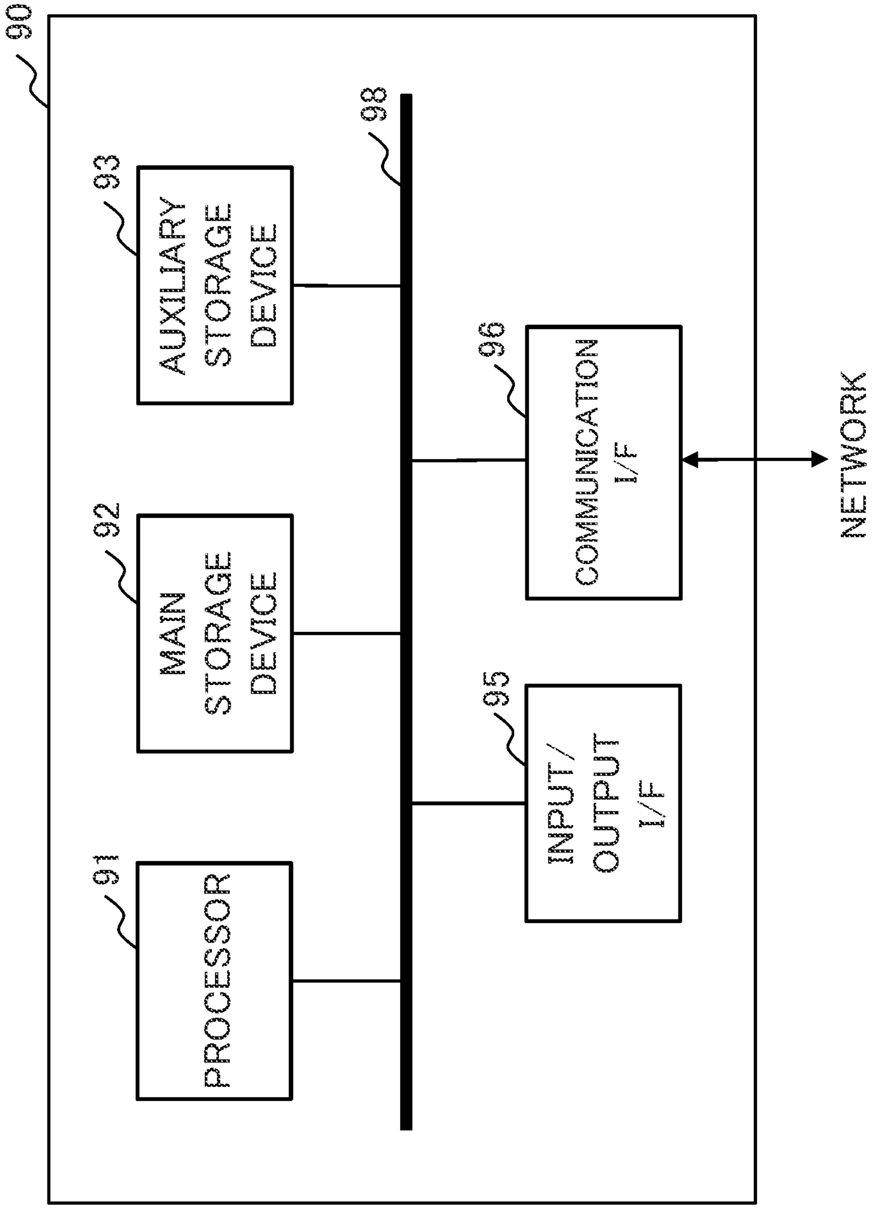
FIG. 19 is a block diagram illustrating an example of a hardware configuration that executes control and processing according to each example embodiment.

As illustrated in FIG. 19, the information processing device 90 includes a processor 91, a main storage device 92, an auxiliary storage device 93, an input/output interface 95, and a communication interface 96. In FIG. 19, the interface is abbreviated as an interface (I/F). The processor 91, the main storage device 92, the auxiliary storage device 93, the input/output interface 95, and the communication interface 96 are data-communicably connected to each other via a bus 98. The processor 91, the main storage device 92, the auxiliary storage device 93, and the input/output interface 95 are connected to a network such as the Internet or an intranet via the communication interface 96.

The processor 91 develops a program (instruction) stored in the auxiliary storage device 93 or the like in the main storage device 92. For example, the program is a software program for executing control and processing of each example embodiment. The processor 91 executes the program developed in the main storage device 92. The processor 91 executes the program to execute control and processing according to each example embodiment.

The main storage device 92 has an area in which a program is developed. A program stored in the auxiliary storage device 93 or the like is developed in the main storage device 92 by the processor 91. The main storage device 92 is achieved by, for example, a volatile memory such as a dynamic random access memory (DRAM). As the main storage device 92, a non-volatile memory such as a magnetoresistive random access memory (MRAM) may be configured/added.

The auxiliary storage device 93 stores various pieces of data such as programs. The auxiliary storage device 93 is achieved by a local disk such as a hard disk or a flash memory. Various pieces of data may be stored in the main storage device 92, and the auxiliary storage device 93 may be omitted.

The input/output interface 95 is an interface that connects the information processing device 90 with a peripheral device based on a standard or a specification. The communication interface 96 is an interface that connects to an external system or a device through a network such as the Internet or an intranet in accordance with a standard or a specification. As an interface connected to an external device, the input/output interface 95 and the communication interface 96 may be shared.

An input device such as a keyboard, a mouse, or a touch panel may be connected to the information processing device 90 as necessary. These input devices are used to input of information and settings. In a case where a touch panel is used as the input device, a screen having a touch panel function serves as an interface. The processor 91 and the input device are connected via the input/output interface 95.

The information processing device 90 may be provided with a display device for displaying information. In a case where a display device is provided, the information processing device 90 includes a display control device (not illustrated) that controls display of the display device. The information processing device 90 and the display device are connected via the input/output interface 95.

The information processing device 90 may be provided with a drive device. The drive device mediates reading of data and a program stored in a recording medium and writing of a processing result of the information processing device 90 to the recording medium between the processor 91 and the recording medium (program recording medium). The information processing device 90 and the drive device are connected via an input/output interface 95.

The above is an example of a hardware configuration for enabling control and processing according to each example embodiment of the present invention. The hardware configuration of FIG. 19 is an example of a hardware configuration for executing control and processing according to each example embodiment and does not limit the scope of the present invention. A program for causing a computer to execute control and processing according to each example embodiment is also included in the scope of the present invention.

A program recording medium in which the program according to each example embodiment is recorded is also included in the scope of the present invention. The recording medium can be achieved by, for example, an optical recording medium such as a compact disc (CD) or a digital versatile disc (DVD). The recording medium may be achieved by a semiconductor recording medium such as a Universal Serial Bus (USB) memory or a secure digital (SD) card. The recording medium may be achieved by a magnetic recording medium such as a flexible disk, or another recording medium. In a case where the program executed by the processor is recorded in the recording medium, the recording medium is a program recording medium.

The components of the example embodiments may be combined in any manner. The components of the example embodiments may be implemented by software. The components of each example embodiment may be implemented by a circuit.

The previous description of embodiments is provided to enable a person skilled in the art to make and use the present invention. Moreover, various modifications to these example embodiments will be readily apparent to those skilled in the art, and the generic principles and specific examples defined herein may be applied to other embodiments without the use of inventive faculty. Therefore, the present invention is not intended to be limited to the example embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A data relay device comprising:
a storage;
at least one memory storing instructions; and
at least one processor connected to the at least one memory and configured to execute the instructions to:
receive gait data including a feature amount extracted from sensor data related to a motion of a foot measured by a measurement device mounted in footwear of a subject;
store the received gait data;
receive a put-on/take-off signal indicating whether the subject puts on or takes off the footwear according to changes in the sensor data related to the motion of the foot;
output a sound to the subject according to the put-on/take-off signal, the sound being different between when the subject goes out and when the subject comes home; and
output target data including the gait data stored in the storage at a preset transmission timing.

2. The data relay device according to claim 1, wherein
the at least one processor is configured to execute the instructions to
generate sound data related to a sound of the subject,
store the generated sound data in the storage, and
output the target data including the gait data and the sound data stored in the storage at the preset transmission timing.

3. The data relay device according to claim 1, wherein
the at least one processor is configured to execute the instructions to
receive a detection signal in response to detection of a person including the subject near the data relay device,
transmit a data request signal requesting transmission of the gait data in response to reception of the detection signal, and
store the gait data transmitted in response to the data request signal in the storage.

4. A measurement system comprising:
the data relay device according to claim 1; and
the measurement device mounted in the footwear of the subject, wherein
the measurement device includes
a sensor that measures a spatial acceleration and a spatial angular velocity, generates the sensor data related to the motion of the foot using the measured spatial acceleration and the measured spatial angular velocity, and outputs the generated sensor data, at least one memory storing instructions, and at least one processor connected to the at least one memory, and wherein the at least one processor is configured to execute the instructions to acquire time series data of the sensor data, extract a feature amount related to a gait from the time series data of the sensor data, generate the gait data including the extracted feature amount, and transmit the generated gait data to the data relay device.

5. The measurement system according to claim 4, wherein the at least one processor of the measurement device is configured to execute the instructions to detect whether the subject puts on or takes off the footwear using the sensor data, and transmit the put-on/take-off signal indicating whether the subject puts on or takes off the footwear to the data relay device in response to detecting whether the subject puts on or takes off the footwear.

6. The measurement system according to claim 4 further comprising:

a human sensor that is disposed near the data relay device to transmit a detection signal to the data relay device in response to detection of a person including the subject, wherein the data relay device transmits a data request signal requesting transmission of the gait data to the measurement device in response to reception of the detection signal, and wherein the measurement device transmits the gait data to the data relay device in response to the data request signal.

7. A data relay method executed by a computer, the data relay method comprising:

receiving gait data including a feature amount extracted from sensor data related to a motion of a foot of a subject;

storing the received gait data;

receiving a put-on/take-off signal indicating whether the subject puts on or takes off a footwear according to changes in the sensor data related to the motion of the foot;

outputting a sound to the subject according to the put-on/take-off signal, the sound being different between when the subject goes out and when the subject comes home; and outputting target data including the stored gait data at a preset transmission timing.

8. A non-transitory recording medium storing a program for causing a computer to execute:

receiving gait data including a feature amount extracted from sensor data related to a motion of a foot of a subject;

storing the received gait data;

receiving a put-on/take-off signal indicating whether the subject puts on or takes off a footwear according to changes in the sensor data related to the motion of the foot;

outputting a sound to the subject according to the put-on/take-off signal, the sound being different between when the subject goes out and when the subject comes home; and outputting target data including the stored gait data at a preset transmission timing.

* * * * *